United States Patent
Yu et al.

(10) Patent No.: US 11,232,056 B2
(45) Date of Patent: Jan. 25, 2022

(54) SYSTEM AND METHOD FOR VECTOR COMMUNICATION

(71) Applicant: Intel Corporation, Santa Clara, CA (US)

(72) Inventors: Wenqian Yu, Shanghai (CN); Cunming Liang, Shanghai (CN); Ping Yu, Shanghai (CN); Shun Hao, Shanghai (CN); Helin Zhang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 90 days.

(21) Appl. No.: 16/464,560

(22) PCT Filed: Dec. 28, 2016

(86) PCT No.: PCT/CN2016/112710
§ 371 (c)(1),
(2) Date: May 28, 2019

(87) PCT Pub. No.: WO2018/119778
PCT Pub. Date: Jul. 5, 2018

(65) Prior Publication Data
US 2020/0301861 A1    Sep. 24, 2020

(51) Int. Cl.
*G06F 13/38*    (2006.01)
*G06F 9/30*    (2018.01)
(Continued)

(52) U.S. Cl.
CPC ........ *G06F 13/385* (2013.01); *G06F 9/30036* (2013.01); *G06F 9/3555* (2013.01); *G06F 9/466* (2013.01); *G06F 2213/0026* (2013.01)

(58) Field of Classification Search
CPC .. G06F 13/385; G06F 9/30036; G06F 9/3555; G06F 9/466
(Continued)

(56) References Cited

U.S. PATENT DOCUMENTS 5,175,856 A * 12/1992 Van Dyke ................. G06F 8/41
711/E12.006
5,768,546 A *  6/1998 Kwon ................. G06F 13/4018
710/307
(Continued)

FOREIGN PATENT DOCUMENTS

WO      2018119778 A1    7/2018

OTHER PUBLICATIONS

PCT International Search Report and Written Opinion for PCT/CN2016/112710 dated Sep. 27, 2017; 13 pages.

*Primary Examiner* — Paul R. Myers
(74) *Attorney, Agent, or Firm* — Patent Capital Group

(57) ABSTRACT

There is disclosed in an example, an endpoint apparatus for an interconnect, comprising: a mechanical and electrical interface to the interconnect; and one or more logic elements comprising an interface vector engine to: receive a first scalar transaction for the interface; determine that the first scalar transaction meets a criterion for vectorization; receive a second scalar transaction for the interface; determine that the second transaction meets the criterion for vectorization; vectorize the first scalar transaction and second scalar transaction into a vector transaction; and send the vector transaction via the electrical interface.

18 Claims, 17 Drawing Sheets

(51) Int. Cl.
 *G06F 9/355* (2018.01)
 *G06F 9/46* (2006.01)
(58) Field of Classification Search
 USPC .......................... 710/313, 307, 314
 See application file for complete search history.

(56) References Cited

U.S. PATENT DOCUMENTS

| | | | | |
|---|---|---|---|---|
| 5,802,375 | A * | 9/1998 | Ngo | G06F 8/452 |
| | | | | 717/150 |
| 6,098,144 | A * | 8/2000 | De Oliveira | G06F 9/4812 |
| | | | | 710/269 |
| 6,408,295 | B1 * | 6/2002 | Aggarwal | G06F 16/35 |
| | | | | 707/694 |
| 6,647,438 | B1 * | 11/2003 | Connor | G06F 13/28 |
| | | | | 370/400 |
| 8,122,177 | B1 * | 2/2012 | Puranik | G06F 13/28 |
| | | | | 710/308 |
| 8,352,484 | B1 * | 1/2013 | Schneider | H04L 67/04 |
| | | | | 370/252 |
| 9,608,936 | B1 * | 3/2017 | Mehrotra | H04L 67/2842 |
| 2003/0188299 | A1 * | 10/2003 | Broughton | G06F 8/443 |
| | | | | 717/141 |
| 2003/0198188 | A1 * | 10/2003 | Castlebury | H04L 67/04 |
| | | | | 370/252 |
| 2006/0015618 | A1 * | 1/2006 | Freimuth | H04L 49/9063 |
| | | | | 709/226 |
| 2006/0168384 | A1 * | 7/2006 | Radhakrishnan | G06F 13/385 |
| | | | | 710/260 |
| 2006/0198324 | A1 * | 9/2006 | Nerses | H04M 3/56 |
| | | | | 370/260 |
| 2009/0158298 | A1 * | 6/2009 | Saxena | G06F 16/2358 |
| | | | | 719/318 |
| 2009/0271509 | A1 | 10/2009 | Cao et al. | |
| 2009/0307656 | A1 * | 12/2009 | Eichenberger | G06F 8/45 |
| | | | | 717/110 |
| 2010/0042815 | A1 * | 2/2010 | Gonion | G06F 9/3887 |
| | | | | 712/222 |
| 2010/0332792 | A1 | 12/2010 | Clifton | |
| 2011/0214016 | A1 * | 9/2011 | Gschwind | G06F 11/1497 |
| | | | | 714/16 |
| 2011/0285729 | A1 * | 11/2011 | Munshi | G06F 9/5044 |
| | | | | 345/536 |
| 2012/0054379 | A1 * | 3/2012 | Leung | G06F 1/3275 |
| | | | | 710/23 |
| 2013/0024652 | A1 | 1/2013 | Bailey et al. | |
| 2013/0036268 | A1 | 2/2013 | Espasa et al. | |
| 2014/0237460 | A1 * | 8/2014 | Schmidt | H04M 3/56 |
| | | | | 370/260 |
| 2015/0067298 | A1 | 3/2015 | Boersma et al. | |
| 2015/0095625 | A1 * | 4/2015 | Hassanein | G06F 16/2358 |
| | | | | 719/318 |
| 2015/0268940 | A1 | 9/2015 | Baghsorkhi et al. | |
| 2015/0286472 | A1 * | 10/2015 | Lim | G06F 9/4812 |
| | | | | 710/269 |
| 2016/0134532 | A1 * | 5/2016 | Hwang | H04L 5/00 |
| | | | | 370/392 |

* cited by examiner

|        | +0 | | | | | | | | +1 | | | | | | | | +2 | | | | | | | | +3 | | | | | | | |
|        | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| BYTE0  | \multicolumn{4}{l|}{Fmt} | \multicolumn{4}{l|}{Type} | V | \multicolumn{3}{l|}{TC} | R | \multicolumn{3}{l|}{ATR} | R | TH | TD | EP | \multicolumn{2}{l|}{ATR} | \multicolumn{2}{l|}{AT} | \multicolumn{8}{l|}{NUM} |
| BYTE4  | \multicolumn{16}{l|}{REQUEST ID} | \multicolumn{8}{l|}{TAG} | \multicolumn{8}{l|}{MSG CODE} |
| BYTE8  | \multicolumn{8}{l|}{LEN 1} | \multicolumn{8}{l|}{RESERVED} | \multicolumn{8}{l|}{LEN 2} | \multicolumn{8}{l|}{RESERVED} |
| BYTE12 | \multicolumn{8}{l|}{LEN 3} | \multicolumn{8}{l|}{RESERVED} | \multicolumn{8}{l|}{LEN 4} | \multicolumn{8}{l|}{RESERVED} |
| BYTE16 | \multicolumn{32}{l|}{SRC ADDR 1} |
| BYTE20 | \multicolumn{32}{l|}{SRC ADDR 2} |
| BYTE24 | \multicolumn{32}{l|}{SRC ADDR 3} |
| BYTE28 | \multicolumn{32}{l|}{SRC ADDR 4} |

VECTOR TLP READ FORMAT

*Fig. 9*

| | +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| BYTE0 | Fmt | | | Type | | | | | V | TC | | | | R | ATR | | R | TH | TD | EP | ATR | | AT | | NUM | | | | | | | |
| BYTE4 | COMPLETER ID | | | | | | | | | | | | | | | | STATUS | | | EP | | | | | OPTIONAL | | | | | | | |
| BYTE8 | REQUESTER ID | | | | | | | | | | | | | | | | TAG | | | | | | | | MESSAGE CODE | | | | | | | |
| BYTE12 | LEN 1 | | | | | | | | RESERVED | | | | | | | | LEN 2 | | | | | | | | RESERVED | | | | | | | |
| BYTE16 | LEN 3 | | | | | | | | RESERVED | | | | | | | | LEN 4 | | | | | | | | RESERVED | | | | | | | |
| BYTE20 | PAYLOAD 1/PADDING 1 | | | | | | | | | | | | | | | | | | | | | | | | | | | | | | | |
| BYTE20+⌈(LEN1+PAD1)/4⌉ | PAYLOAD 2/PADDING 2 | | | | | | | | | | | | | | | | | | | | | | | | | | | | | | | |
| BYTE20+⌈(LEN1+LEN2+PAD1+PAD2)/4⌉ | PAYLOAD 3/PADDING 3 | | | | | | | | | | | | | | | | | | | | | | | | | | | | | | | |
| BYTE20+⌈(LEN1+PAD1+LEN2+PAD2+LEN3+PAD3)/4⌉ | PAYLOAD 4/PAD 4 | | | | | | | | | | | | | | | | | | | | | | | | | | | | | | | |

VECTOR TLP READ COMPLETE FORMAT

*Fig. 10*

| | +0 | | | | | | | | +1 | | | | | | | | +2 | | | | | | | | +3 | | | | | | | |
|---|---|---|---|---|---|---|---|---|---|---|---|---|---|---|---|---|---|---|---|---|---|---|---|---|---|---|---|---|---|---|---|
| | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 | 7 | 6 | 5 | 4 | 3 | 2 | 1 | 0 |
| BYTE0 | Fmt | | | Type | | | | | V | | TC | | | R | ATR | R | TH | TD | EP | ATR | | AT | | | NUM | | | | | | | |
| BYTE4 | REQUESTER ID | | | | | | | | | | | | | | | | TAG | | | | | | | | MESSAGE CODE | | | | | | | |
| BYTE8 | LEN 1 | | | | | | | | RESERVED | | | | | | | | LEN 2 | | | | | | | | RESERVED | | | | | | | |
| BYTE12 | LEN 3 | | | | | | | | RESERVED | | | | | | | | LEN 4 | | | | | | | | RESERVED | | | | | | | |
| BYTE16 | DEST ADDR 1 | | | | | | | | | | | | | | | | | | | | | | | | | | | | | | | |
| BYTE20 | DEST ADDR 2 | | | | | | | | | | | | | | | | | | | | | | | | | | | | | | | |
| BYTE24 | DEST ADDR 3 | | | | | | | | | | | | | | | | | | | | | | | | | | | | | | | |
| BYTE28 | DEST ADDR 4 | | | | | | | | | | | | | | | | | | | | | | | | | | | | | | | |
| BYTE32 | PAYLOAD 1/PAD 1 | | | | | | | | | | | | | | | | | | | | | | | | | | | | | | | |
| BYTE32+(LEN1+PAD1)/4 | PAYLOAD 2/PAD 2 | | | | | | | | | | | | | | | | | | | | | | | | | | | | | | | |
| BYTE32+(LEN1+PAD1+LEN 2+PAD2)/4 | PAYLOAD 3/PAD 3 | | | | | | | | | | | | | | | | | | | | | | | | | | | | | | | |
| BYTE32+(LEN1+PAD1+LEN 2+PAD2+LEN3+PAD3)/4 | PAYLOAD 4/PAD 4 | | | | | | | | | | | | | | | | | | | | | | | | | | | | | | | |

VECTOR TLP WRITE FORMAT

*Fig. 11*

SYSTEM AND METHOD FOR VECTOR COMMUNICATION

CROSS-REFERENCE TO RELATED APPLICATION

This application is a national stage application under 35 U.S.C. § 371 of PCT International Application Serial No. PCT/CN2016/112710, filed on Dec. 28, 2016 and entitled "SYSTEM AND METHOD FOR VECTOR COMMUNICATION," which is hereby incorporated by reference herein in its entirety.

FIELD

This disclosure pertains to computing system, and in particular (but not exclusively) to a system and method for vector communication.

BACKGROUND

PCIe is one of a number of interconnect standards. PCIe interconnects are often used to connect peripheral devices to a computing apparatus.

BRIEF DESCRIPTION OF THE DRAWINGS

FIGS. 9-11 illustrate example packet formats.

DETAILED DESCRIPTION

Figure 1:
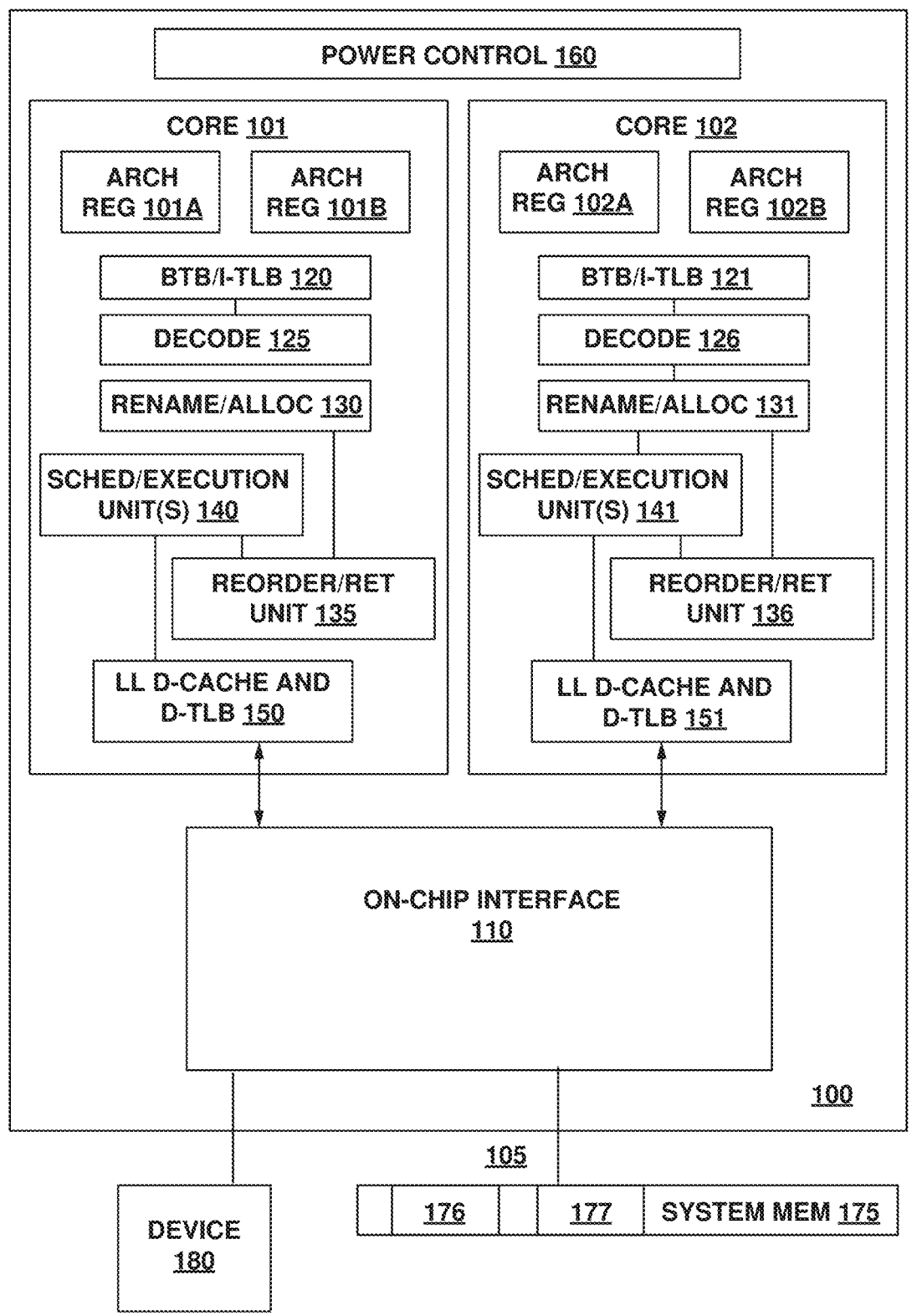
FIG. 1 illustrates an embodiment of a Nock diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present teachings. It will be apparent, however, to one skilled in the art that these specific details need not be employed to practice the present teachings. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present teachings.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the teachings described herein. This specification uses PCIe as a particular example of an interconnect that is suitable for use with the present disclosure. However, the teachings of the present specification are compatible with many different kinds of interconnect.

Intel® Architecture (IA) can refer to a combination of microprocessors and supporting hardware that create the building blocks of many different computing systems. IA may include, for example, one or more microprocessors (each having one or more cores), a platform controller hub (PCH), and other supporting hardware. Some embodiments also include a "northbridge" and "southbridge," although in some newer embodiments, the functions of the northbridge are incorporated into the processor itself, and the functions of the southbridge may be incorporated into the PCH. Any examples provided herein that discuss a northbridge and southbridge should be understood to also encompass embodiments without them, and examples with a PCH and no northbridge or southbridge should be understood to also encompass embodiments with them, unless expressly noted otherwise.

Among many other applications, IA provides powerful, flexible, generic computing capability on server platforms. Among other things, this computing capacity provides a foundation for NFV (Network Function Virtualization), or in other words, the creation of "virtual appliances" that provide network functions previously provided by dedicated hardware appliances. In NFV, a powerful computing platform (such as a rack of blade servers) can dynamically provision NFVs to meet changing network demands. One motivation for using NFVs versus hardware appliances is to decouple software and hardware. However, this also presents new challenges. For example, network I/O (input/output) throughput becomes critical, as many virtual appliances may be sharing a single hardware platform. Cache and memory subsystems, and I/O bus bandwidth capacity and efficiency also become important factors.

PCIe (Peripheral Connect Interface-Express) is a standard I/O bus frequently used on IA and many other platforms. In a typical computing system, many high throughput I/O devices connect directly connect to the IA via a PCIe interface. These may include, by way of nonlimiting example, an Ethernet or other network controller, a hardware cryptographic acceleration card, NVMe (non-volatile memory host controller interface express) controller, a graphics card and/or display adapter, a sound or audio card, and peripheral interfaces. With the performance demands increasing, the PCIe transaction bandwidth generally increases generation over generation.

However, looking at overall the data transform efficiency of PCIe transactions, the DMA (Direct Memory Access) transaction overhead can be very high in certain cases, and especially in cases of small buffer payloads. For example, consider an Ethernet card that handles many small incoming and outgoing transaction. According to current PCIe practice, for each PCIe transaction message, each transaction incurs overhead from a low layer header (e.g. transaction layer packets (TLP)/data link layer (DLL)/physical layer (PL)). Together with additional alignment padding, a single small buffer incurs much more relative overhead than the a large buffer. However, these small packets may be an important factor in successfully providing NFVs.

A PCIe endpoint (e.g., a peripheral device) can optimize certain communications by treating a plurality of small buffers as a single large buffer for PCIe bus purposes. Take, for example, six small buffers that are to be sent serially to the PCIe bus. If these six small buffers are sent to the PCIe bus separately, then the PCIe overhead is incurred six times. But if these six small buffers are "vectorized" (i.e., aggregated into a single vector buffer comprising the six small "scalar" buffers), then the vector can be sent to the PCIe bus, thus incurring the overhead only once. In this case, the six small buffers together incur approximately the same relative overhead as one large buffer.

In one example, a PCIe endpoint aggregates several small buffers of the same size (e.g., several 16-byte descriptors) into a large PCIe transaction payload. As the buffers queue up, they may be aggregated into a contiguous memory area. The small payloads are formed into a single PCIe transaction upon a trigger, such as aggregating enough payloads to reach a threshold (e.g., to ensure that the payload does not become too large), expiration of a timer (to ensure that the first packets queued up are not delayed beyond an acceptable time), or the receipt of a payload that is not of the same type or that exceeds a size threshold. Note that in certain embodiments, the payloads must be of identical type, while in other embodiments, they need only be below a particular threshold.

An illustrative example of this method is DMA descriptor fetching. Even when coalescing DMA descriptor fetches, the read/write operations for associating data with each descriptor are independent PCIe transaction. It can be helpful to batch the buffers that the coalescing descriptors point to. But those buffers may not be contiguous. For a scatter-gather buffer, the PCIe read/write transaction does not coalesce non-contiguous buffers. The CPU can move these data into contiguous temporal buffers, but only at the cost of CPU cycles. Thus, it is advantageous for the PCIe endpoint to be able to autonomously build a vector buffer so that the transactions can be sent in a batch.

Throughout this specification, legacy PCIe read and write transactions, called MRd and MWr respectively, may be referred to as "scalar" transaction. The process of aggregating those scalar transactions may be referred to as "vectorizing," and the resultant transaction may be referred to as a "vector" transaction. To that end, there are also described herein novel vector read (vMRd) and vector write (vMWr) transaction. In an example, after fetching a batch of DMA memory addresses, the PCIe endpoint can decide to issue the vector MRd/MWr transaction that vectorizes multiple buffer into one transaction. Furthermore, the vector operation allows a small DMA scatter buffer (non-contiguous memory) to be transmitted in one PCIe transaction without CPU involvement.

One embodiment of this novel method includes three cooperating parts:
  a. A PCIe vector controller in the PCIe root complex (PCIe controller);
  b. Some novel PCIe TLPs for vector transactions; and
  c. A PCIe vector engine (including appropriate logic and/or hardware) in the PCIe endpoint.

The teachings of this specification can significantly improve the PCIe efficiency on small buffer transmissions between host memory and PCIe I/O endpoint. All PCIe devices (or more generally, devices that connect to any species of interconnect that employs this method) can benefit from these teachings, and in particular, network interface cards (NICs), QAT (QuickAssist Technology), SmartNIC, and eSwitch (embedded switch) NICs.

Referring to FIG. 1, an embodiment of a Nock diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101a and 101b, which may also be referred to as hardware thread slots 101a and 101b. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101a, a second thread is associated with architecture state registers 101b, a third thread may be associated with architecture state registers 102a, and a fourth thread may be associated with architecture state registers 102b. Here, each of the architecture state registers (101a, 101b, 102a, and 102b) may be referred to as processing elements, thread slots, or thread units, as described above. As illustrated, architecture state registers ion are replicated in architecture state registers 101b, so individual architecture states/contexts are capable of being stored for logical processor ion and logical processor 101b. In core 101, other smaller resources, such as instruction pointers and renaming logic in allocator and renamer Nock 130 may also be replicated for threads ion and 101b. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to a fetch unit to decode fetched elements. Fetch logic, in one embodiment, includes individual sequencers associated with thread slots 101a, 101b, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer Nock 130 includes an allocator to reserve resources, such as register files to store instruction processing results. However, threads iota and 101b are potentially capable of out-of-order execution, where allocator and renamer Nock 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) Nock 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface no. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) no includes one or more controller(s) for interfacing with other devices such as memory 175 or a graphics device 180. The configuration including an interconnect and controllers for interfacing with such devices is often referred to as an on-core (or un-core configuration). As an example, on-chip interface no includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 2:
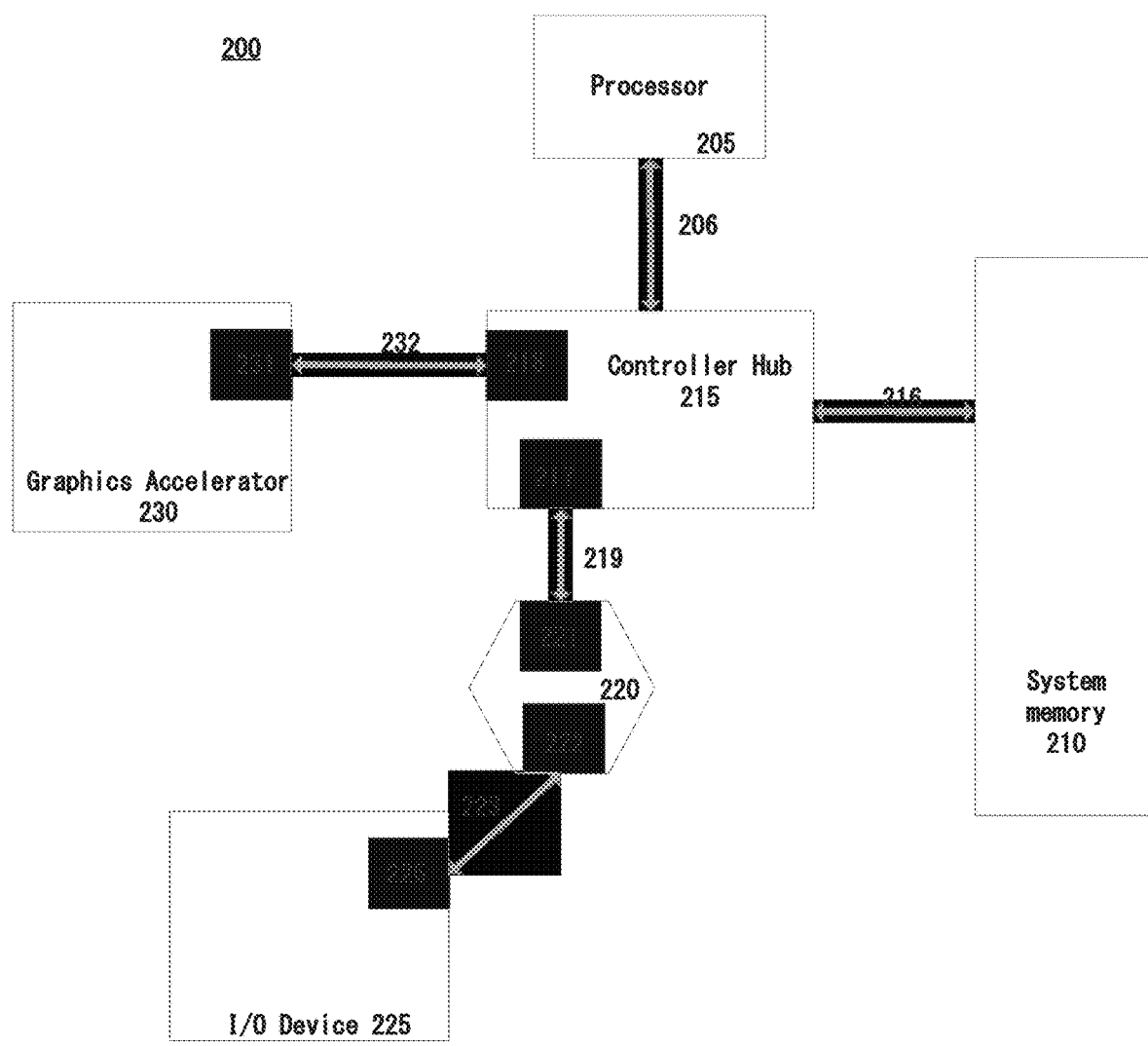
FIG. 2 illustrates an embodiment of a computing system including an interconnect architecture.

Referring to FIG. 2, an embodiment of a fabric composed of point-to-point Links that interconnect a set of components is illustrated. System 200 includes processor 205 and system memory 210 coupled to controller hub 215. Processor 205 includes any processing element, such as a microprocessor, a host processor, an embedded processor, a co-processor, or other processor. Processor 205 is coupled to controller hub 215 through front-side bus (FSB) 206. In one embodiment, FSB 206 is a serial point-to-point interconnect as described below. In another embodiment, link 206 includes a serial, differential interconnect architecture that is compliant with different interconnect standard.

System memory 210 includes any memory device, such as random access memory (RAM), non-volatile (NV) memory, or other memory accessible by devices in system 200. System memory 210 is coupled to controller hub 215 through memory interface 216. Examples of a memory interface include a double-data rate (DDR) memory interface, a dual-channel DDR memory interface, and a dynamic RAM (DRAM) memory interface.

In one embodiment, controller hub 215 is a root hub, root complex, or root controller in a Peripheral Component Interconnect Express (PCIe or PCIE) interconnection hierarchy. Examples of controller hub 215 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 205, while controller 215 is to communicate with I/O devices, in a similar manner as described below. In some embodiments, peer-to-peer routing is optionally supported through root complex 215.

Here, controller hub 215 is coupled to switch/bridge 220 through serial link 219. Input/output modules 217 and 221, which may also be referred to as interfaces/ports 217 and 221, include/implement a layered protocol stack to provide communication between controller hub 215 and switch 220. In one embodiment, multiple devices are capable of being coupled to switch 220.

Switch/bridge 220 routes packets/messages from device 225 upstream, i.e. up a hierarchy towards a root complex, to controller hub 215 and downstream, i.e. down a hierarchy away from a root controller, from processor 205 or system memory 210 to device 225. Switch 220, in one embodiment, is referred to as a logical assembly of multiple virtual PCI-to-PCI bridge devices. Device 225 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 225 may include a PCIe to PCI/PCI-X bridge to support legacy or other version PCI devices. Endpoint devices in PCIe are often classified as legacy, PCIe, or root complex integrated endpoints.

Graphics accelerator 230 is also coupled to controller hub 215 through serial link 232. In one embodiment, graphics accelerator 230 is coupled to an MCH, which is coupled to an ICH. Switch 220, and accordingly I/O device 225, is then coupled to the ICH. I/O modules 231 and 218 are also to implement a layered protocol stack to communicate between graphics accelerator 230 and controller hub 215. Similar to the MCH discussion above, a graphics controller or the graphics accelerator 230 itself may be integrated in processor 205.

Figure 3:
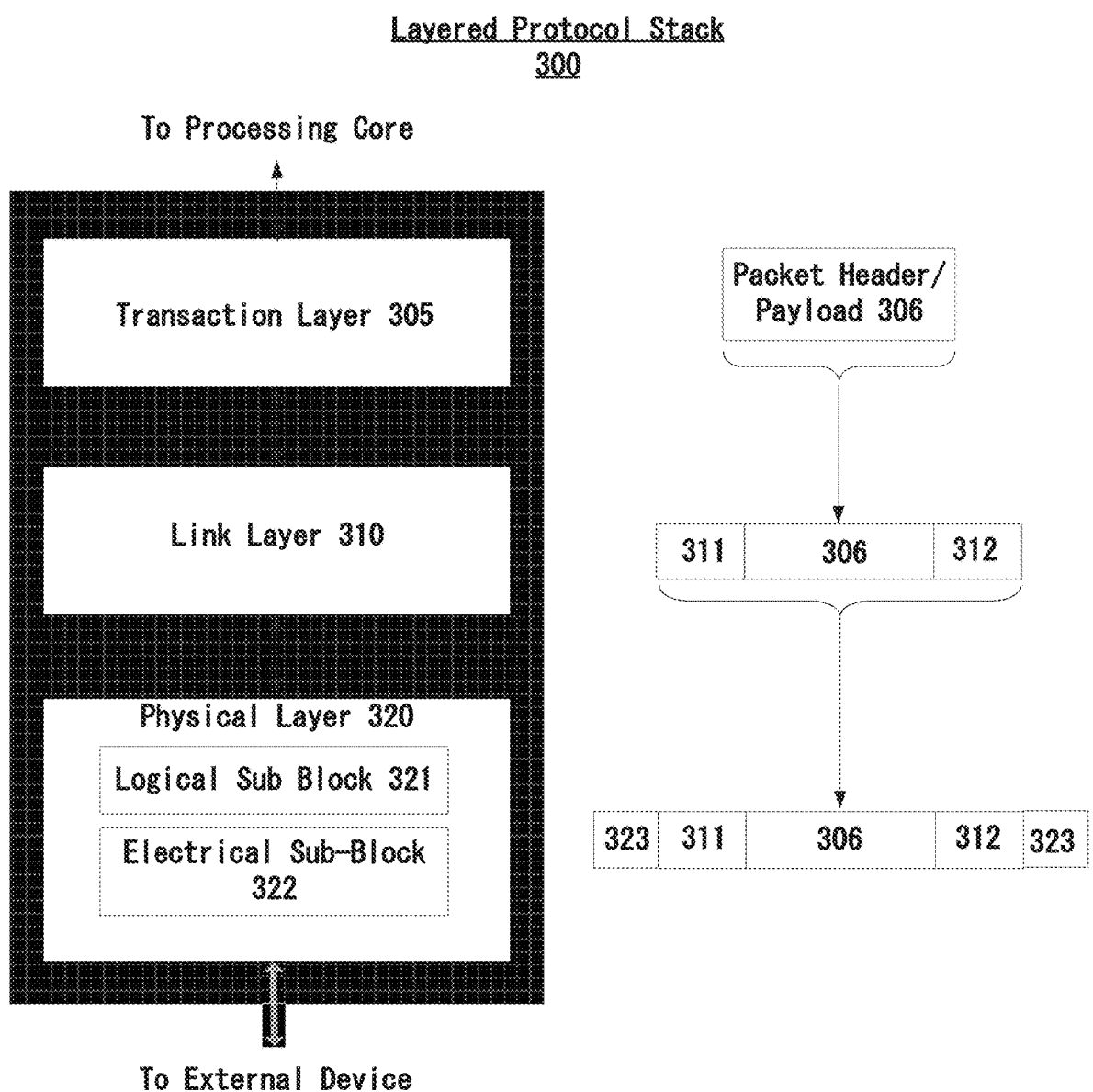
FIG. 3 illustrates an embodiment of a interconnect architecture including a layered stack.

Turning to FIG. 3 an embodiment of a layered protocol stack is illustrated. Layered protocol stack 300 includes any form of a layered communication stack, such as a Quick Path Interconnect (QPI) stack, a PCIe stack, a next generation high performance computing interconnect stack, or other layered stack. Although the discussion immediately below in reference to FIGS. 2-5 are in relation to a PCIe stack, the same concepts may be applied to other interconnect stacks. In one embodiment, protocol stack 300 is a PCIe protocol stack including transaction layer 305, link layer 310, and physical layer 320. An interface, such as PCIe, may be represented as communication protocol stack 300. Representation as a communication protocol stack may also be referred to as a module or interface implementing/including a protocol stack.

PCI Express uses packets to communicate information between components. Packets are formed in the Transaction Layer 305 and Data Link Layer 310 to carry the information from the transmitting component to the receiving component. As the transmitted packets flow through the other layers, they are extended with additional information necessary to handle packets at those layers. At the receiving side the reverse process occurs and packets get transformed from their Physical Layer 320 representation to the Data Link Layer 310 representation and finally (for Transaction Layer Packets) to the form that can be processed by the Transaction Layer 305 of the receiving device.

Transaction Layer

In one embodiment, transaction layer 305 is to provide an interface between a device's processing core and the interconnect architecture, such as data link layer 310 and physical layer 320. In this regard, a primary responsibility of the transaction layer 305 is the assembly and disassembly of packets (i.e., transaction layer packets, or TLPs). The translation layer 305 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 305. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 305 assembles packet header/payload 306. Format for current packet headers/payloads may be found in the PCIe specification at the PCIe specification website.

Figure 4:
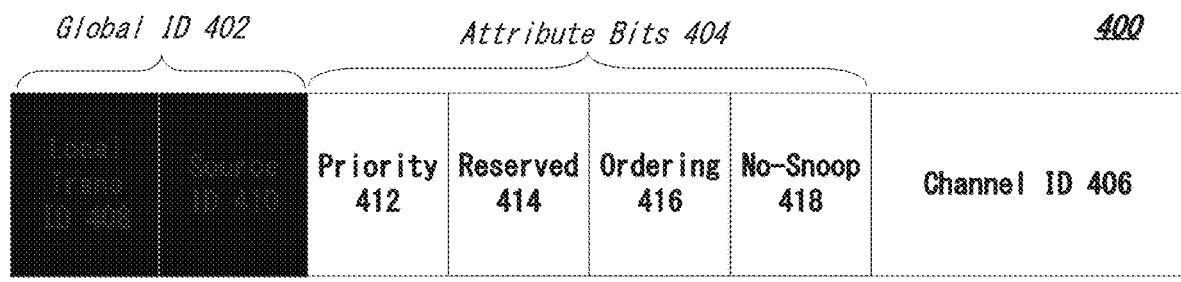
FIG. 4 illustrates an embodiment of a request or packet to be generated or received within an interconnect architecture.

Quickly referring to FIG. 4, an embodiment of a PCIe transaction descriptor is illustrated. In one embodiment, transaction descriptor 400 is a mechanism for carrying transaction information. In this regard, transaction descriptor 400 supports identification of transactions in a system. Other potential uses include tracking modifications of default transaction ordering and association of transaction with channels.

Transaction descriptor 400 includes global identifier field 402, attributes field 404 and channel identifier field 406. In the illustrated example, global identifier field 402 is depicted comprising local transaction identifier field 408 and source identifier field 410. In one embodiment, global transaction identifier 402 is unique for all outstanding requests.

According to one implementation, local transaction identifier field 408 is a field generated by a requesting agent, and it is unique for all outstanding requests that require a completion for that requesting agent. Furthermore, in this example, source identifier 410 uniquely identifies the requestor agent within a PCIe hierarchy. Accordingly, together with source ID 410, local transaction identifier 408 field provides global identification of a transaction within a hierarchy domain.

Attributes field 404 specifies characteristics and relationships of the transaction. In this regard, attributes field 404 is potentially used to provide additional information that allows modification of the default handling of transactions. In one embodiment, attributes field 404 includes priority field 412, reserved field 414, ordering field 416, and no-snoop field 418. Here, priority sub-field 412 may be modified by an initiator to assign a priority to the transaction. Reserved attribute field 414 is left reserved for future, or vendor-defined usage. Possible usage models using priority or security attributes may be implemented using the reserved attribute field.

In this example, ordering attribute field 416 is used to supply optional information conveying the type of ordering that may modify default ordering rules. According to one example implementation, an ordering attribute of "o" denotes default ordering rules are to apply, wherein an ordering attribute of "1" denotes relaxed ordering, wherein writes can pass writes in the same direction, and read completions can pass writes in the same direction. Snoop attribute field 418 is utilized to determine if transactions are snooped. As shown, channel ID Field 406 identifies a channel that a transaction is associated with.

Link Layer

Link layer 310, also referred to as data link layer 310, acts as an intermediate stage between transaction layer 305 and the physical layer 320. In one embodiment, a responsibility of the data link layer 310 is providing a reliable mechanism for exchanging Transaction Layer Packets (TLPs) between two components a link. One side of the Data Link Layer 310 accepts TLPs assembled by the Transaction Layer 305, applies packet sequence identifier 311, i.e. an identification number or packet number, calculates and applies an error detection code, i.e. CRC 312, and submits the modified TLPs to the Physical Layer 320 for transmission across a physical to an external device.

Physical Layer

In one embodiment, physical layer 320 includes logical sub Nock 321 and electrical sub-Nock 322 to physically transmit a packet to an external device. Here, logical sub-Nock 321 is responsible for the "digital" functions of Physical Layer 321. In this regard, the logical sub-Nock includes a transmit section to prepare outgoing information for transmission by physical sub-Nock 322, and a receiver section to identify and prepare received information before passing it to the Link Layer 310.

Physical Nock 322 includes a transmitter and a receiver. The transmitter is supplied by logical sub-Nock 321 with symbols, which the transmitter serializes and transmits onto to an external device. The receiver is supplied with serialized symbols from an external device and transforms the received signals into a bit-stream. The bit-stream is de-serialized and supplied to logical sub-Nock 321. In one embodiment, an 8b/10b transmission code is employed, where ten-bit symbols are transmitted/received. Here, special symbols are used to frame a packet with frames 323. In addition, in one example, the receiver also provides a symbol dock recovered from the incoming serial stream.

As stated above, although transaction layer 305, link layer 310, and physical layer 320 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 5:
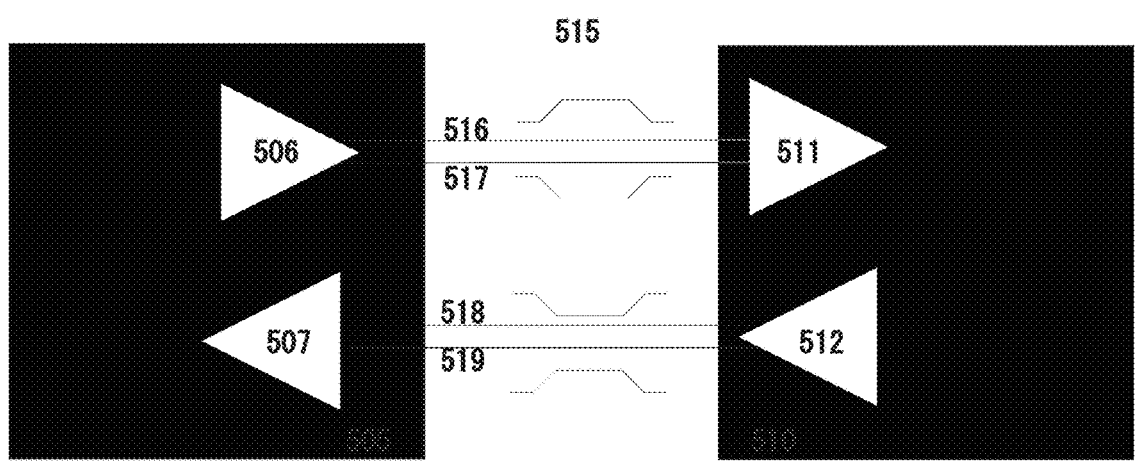
FIG. 5 illustrates an embodiment of a transmitter and receiver pair for an interconnect architecture.

Referring next to FIG. 5, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 506/511 and a receive pair 512/507. Accordingly, device 505 includes transmission logic 506 to transmit data to device 510 and receiving logic 507 to receive data from device 510. In other words, two transmitting paths, i.e. paths 516 and 517, and two receiving paths, i.e. paths 518 and 519, are included in a PCIe link.

A transmission path refers to any path for transmitting data, such as a transmission line, a copper line, an optical line, a wireless communication channel, an infrared communication link, or other communication path. A connection between two devices, such as device 505 and device 510, is referred to as a link, such as link 515. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 516 and 517, to transmit differential signals. As an example, when line 516 toggles from a low voltage level to a high voltage level, i.e. a rising edge, line 517 drives from a high logic level to a low logic level, i.e. a falling edge. Differential signals potentially demonstrate better electrical characteristics, such as better signal integrity, i.e. cross-coupling, voltage overshoot/undershoot, ringing, etc. This allows for better timing window, which enables faster transmission frequencies.

Figure 6:
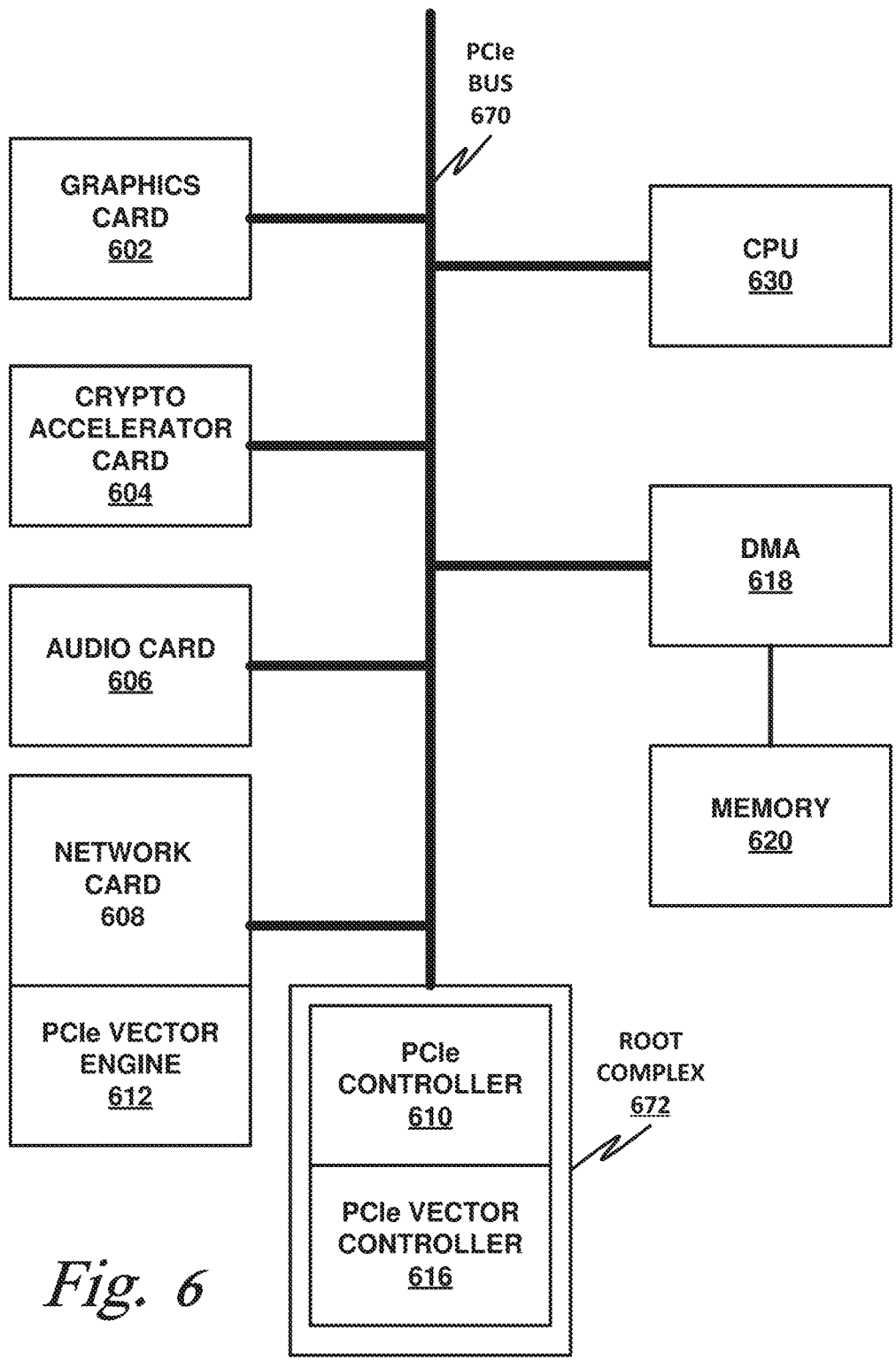
FIG. 6 illustrates a Nock diagram of an embodiment of an interconnect.

Turning to FIG. 6, in this example there is shown a PCIe bus 670, which is one nonlimiting example of an interconnect that is compatible with the teachings of this specification. Other buses or interconnects that may be compatible with the teachings of this specification include USB, PCI, PCI-X, ISA, HPI, MIPI, AGP, and SATA, by way of non-limiting example.

PCIe bus 670 is controlled by a PCIe root complex 672, including by way of example a PCIe controller 610 and PCIe vector controller 616. Additional details of PCIe root complex 672 are disclosed in FIG. 7.

In this example, PCIe bus 670 communicatively couples a DMA controller 618 and CPU 630 to several peripheral devices, which function as PCIe endpoints. This enables PCIe endpoints to communicate with CPU 630, and to directly access memory 620.

In this example, PCIe endpoints include graphics card 602, crypto accelerator card 604, audio card 606, and network card 608. Some or all of these PCIe endpoints may be legacy endpoints that are not compatible with the methods disclosed herein. Root complex 672 may be configured to be backward compatible with such legacy endpoints. However, in this case, at least network card 608 includes a PCIe vector engine 612, which is configured to provide vectorization of PCIe transactions as described herein. More specifically, PCIe vector engine 612 may include any necessary hardware, software, and/or firmware to provide the logic for carrying out the PCIe vectorization methods disclosed herein. This may include, for example, an embedded processor, ASIC, ROM, or FPGA encoded with instructions for providing vectorization logic. This may also include volatile or non-volatile memory for loading and processing instructions.

Figure 7:
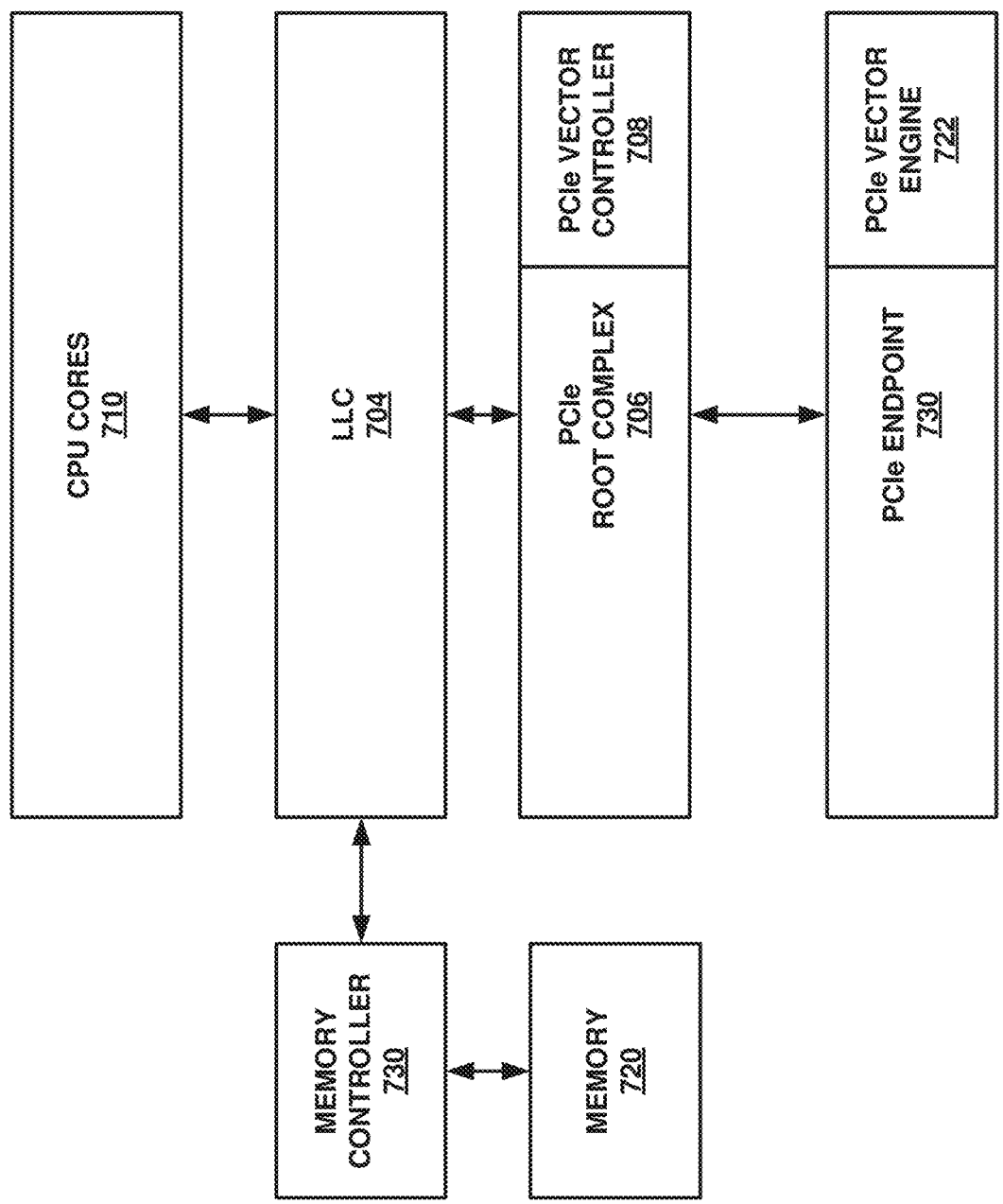
FIG. 7 is a Nock diagram of an interconnected system.

FIG. 7 illustrates an additional logical view of the teachings of the present specification. A PCIe endpoint 730 includes a PCIe vector engine 722. PCIe endpoint 730 may be any of the PCIe endpoints disclosed in FIG. 6, or any other PCIe endpoint. PCIe vector engine 722 may correspond to PCIe vector engine 612 of FIG. 6.

PCIe root complex 706 may correspond to root complex 672 of FIG. 6, and PCIe vector controller 708 may correspond to PCIe vector controller 616 of FIG. 6. In this example, root complex 706 communicates directly with last-level cache (LLC) 704 (e.g., a highest-level cache usually shared between cores), which provides cached data and instructions for CPU cores 710, and for PCIe devices. LLC 704 for its part communicates with memory controller (MC) 730, which accesses main memory 720 to retrieve data for storing in cache, and to write data from cache to main memory.

When PCIe vector controller 708 receives a PCIe vector read or write transaction, it recognizes the vectorized memory request, and splits the individual (scalar) PCIe requests out into multiple memory access operations. These can then be sent out to memory controller 732, which may correspond to DMA controller 618 of FIG. 6.

Facing MC 732, PVC 708 is responsible for the following, by way of nonlimiting examples:

a. For vector transactions from endpoint 730, PVC 708 breaks the transactions down into scalar (individual) memory operations before sending the operations to LLC 704 or MC 732.
b. For responses from memory controller 730 or LLC 704, PVC 708 vectorizes the scalar memory operations, and sends them to endpoint 730 as a single vector transaction.

In certain embodiments, MC 732 may also be configured to handle vector transactions. In that case, PVC 708 may pass transactions to MC 732 as vector transactions.

On PCIe endpoint 730, the mechanism to trigger a vector PCIe transaction can be based on a threshold, a timer, or any other suitable aggregation trigger. For example, when PCIe endpoint 730 encounters a "small" packet (i.e., a packet beneath a size threshold), if the vector feature is enabled on that PCIe endpoint, the packet is saved for aggregation in a vector format. Packets may continue to be aggregated until the overall vector transaction exceeds a maximum vector size threshold, or a timeout is reached. This realizes advantages over earlier PCIe specifications, in which any memory Rd/Wr action takes one PCIe transaction, regardless of size. This means that transactions can be inefficient for small memory operations.

Note that in some examples, factors such as the vector size threshold and timeout may be user configurable. For example, a user interface may be provided to enable a user to configure the values. For example, the user interface could include an API, a GUI, a textual user interface, a command-line interface, a jumper, a register, or a signal line that provides configuration.

In certain earlier systems, packets can be aggregated into a larger buffer by CPU 710. For example, software can collect small buffers and converge them into one large buffer. That single buffer can then be issued via the PCIe bus. However, this type of operation is expensive in terms of CPU cycles. In the particular case of NFV, it is advantageous to preserve CPU cycles for workload processing rather than micromanaging memory transactions.

Advantageously, a PCIe vector engine 722 within PCIe endpoint 730 can manage small memory transactions transparently to software, and does not require any change to existing DMA drivers. The improvement directly benefits operations such as "scatters" of small buffers. No additional CPU cycles is required to boost high volume small packets.

Figure 8:
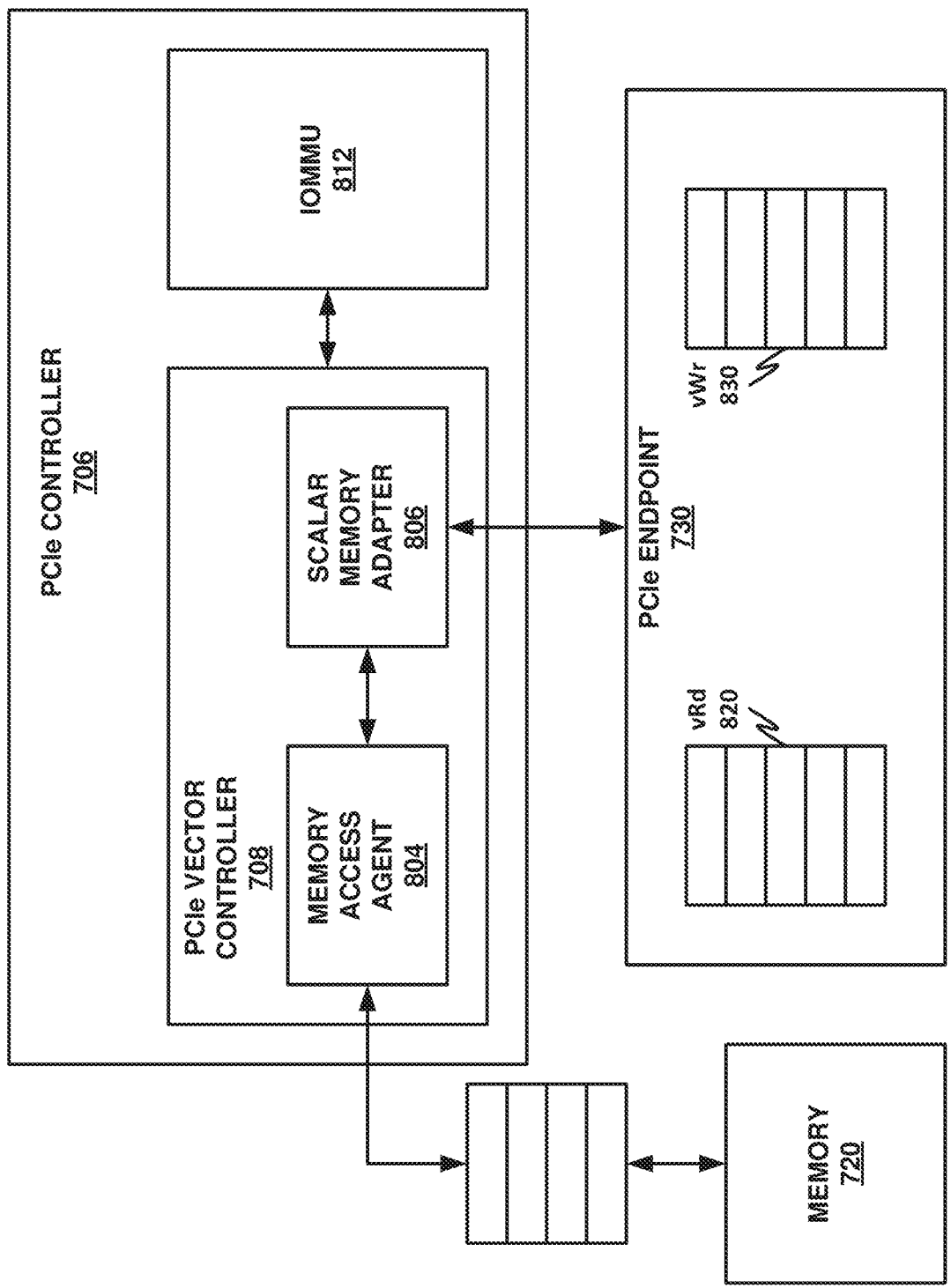
FIG. 8 is a Nock diagram of an interconnected system.

FIG. 8 illustrates selected logic components of a PCIe Vector Engine according to one or more examples of the present specification.

PCIe controller 706 (i.e., the PCIe root complex) includes PCIe vector controller 708. PCIe vector controller 708 interacts with input/output memory management unit (IOMMU) 812. IOMMU 812 translates CPU-visible virtual addresses to device-visible virtual addresses.

A scalar memory adapter 806 within PCIe vector controller 708 is responsible for translating the novel vector PCIe transactions into scalar memory accesses. For example, after PCIe endpoint 730 aggregates enough small reads into vector read 820 (such as in a "gather"), PCIe endpoint 730 sends the vector read to PCIe controller 706. Scalar memory adapter 806 then breaks vector read 820 down into individual scalar read operations. Memory access agent 804 is then responsible for sending each individual scalar memory access to memory or cache.

PCIe vector controller 708 may also receive individual read completes responsive to the read operations in vector read 820. Memory access agent 804 receives these, and passes them to scalar memory adapter 806, which aggregates the responses into a vector read complete, which is then passed to PCIe endpoint 730.

When PCIe endpoint 730 needs to aggregate writes to memory, it may aggregate several small writes (such as a "scatter" operation) into a vector write 830. PCIe endpoint 730 sends vector write 830 to PCIe controller 706, and scalar memory adapter 804 breaks the writes down into individual write operations. These are then provided to memory access agent 804, which provides the individual scalar memory operations to memory 720.

FIGS. 9, 10, and 11 are Nock diagrams of example vector TLP messages according to one or more examples of the presents specification. Note that these vector TLP message formats are provided by way of nonlimiting example and illustration. These examples use a 32-bit address with four scalar operations per packet. This is to illustrate one embodiment, but it should be noted that any suitable number of packets may be attached to the TLP vector messages, and the disclosed formats may be adapted to other address bus sizes, such as 64 or 128 bit addresses.

FIG. 9 is a Nock diagram of a PCIe vector read (vRd) message format.

PCIe Express uses a packet based protocol to exchange information between the transactions layers of two components communicating with each other. The PCIe 3.0 spec supports the following basic transaction TLP types: Memory, I/O, Configuration, and Messages. The memory transaction type supports Memory Read (MRd) and Memory Write (MWr) requests, with the former being used for DMA reads from memory to the PCIe endpoint, and the latter being used for DMA writes from the PCIe endpoint to memory. This specification expands those existing capabilities into vector read and write capabilities.

In an example, routing for vector messages is based on the first address. An error is reported if the vector read/write fails. Furthermore, in an example, support for TLP vector operations can be queried.

Certain elements of the message formats of FIGS. 9, 10, and 11 are consistent with existing PCIe practice. Novel elements and fields include, by way of nonlimiting example:
 a. V: The 24th bit of the first data word is defined as a "Vector Enabled" bit to indicate whether this is vector message.
 b. Num: Replaces the "length" field in existing PCIe message format to indicate the number of small packets are vectored together when V is set.
 c. Lenx: Indicate the length of each small packet. In this example, the field is 10 bits wide, enabling individual "small" packets up to 4 kilobits long. Note that 4 kilobits may be, but need not be, the threshold for whether a scalar memory operation is aggregated into a vector operation. In this example, each Len occupies mbits, and is followed by six reserved bits. Thus, each four bytes (32-bits) includes two Lenx fields. If Num is odd, the reserved field following the last Len may be extended to 22 bits for alignment.
 d. SrcAddrx: Indicate the scalar source address of each small packet.

FIG. 10 illustrates the vector TLP read complete format. In this case, once again, some fields may be consistent with the existing PCIe "Read Complete" message format. Other fields are described above in connection with FIG. 9.

The TLP read complete may also provide the following additional fields:
 a. Payloadx: The payload fields are for holding the plurality of payloads provided by the vector read operation.

FIG. 11 illustrates the vector TLP write format. In this case, once again, some fields may be consistent with the existing PCIe write message format. Other fields are described above in connection with FIG. 9.

The TLP vector write may also provide the following additional fields:
 a. DstAddrx: These indicate the scalar destination address for each small packet.

Figure 12:
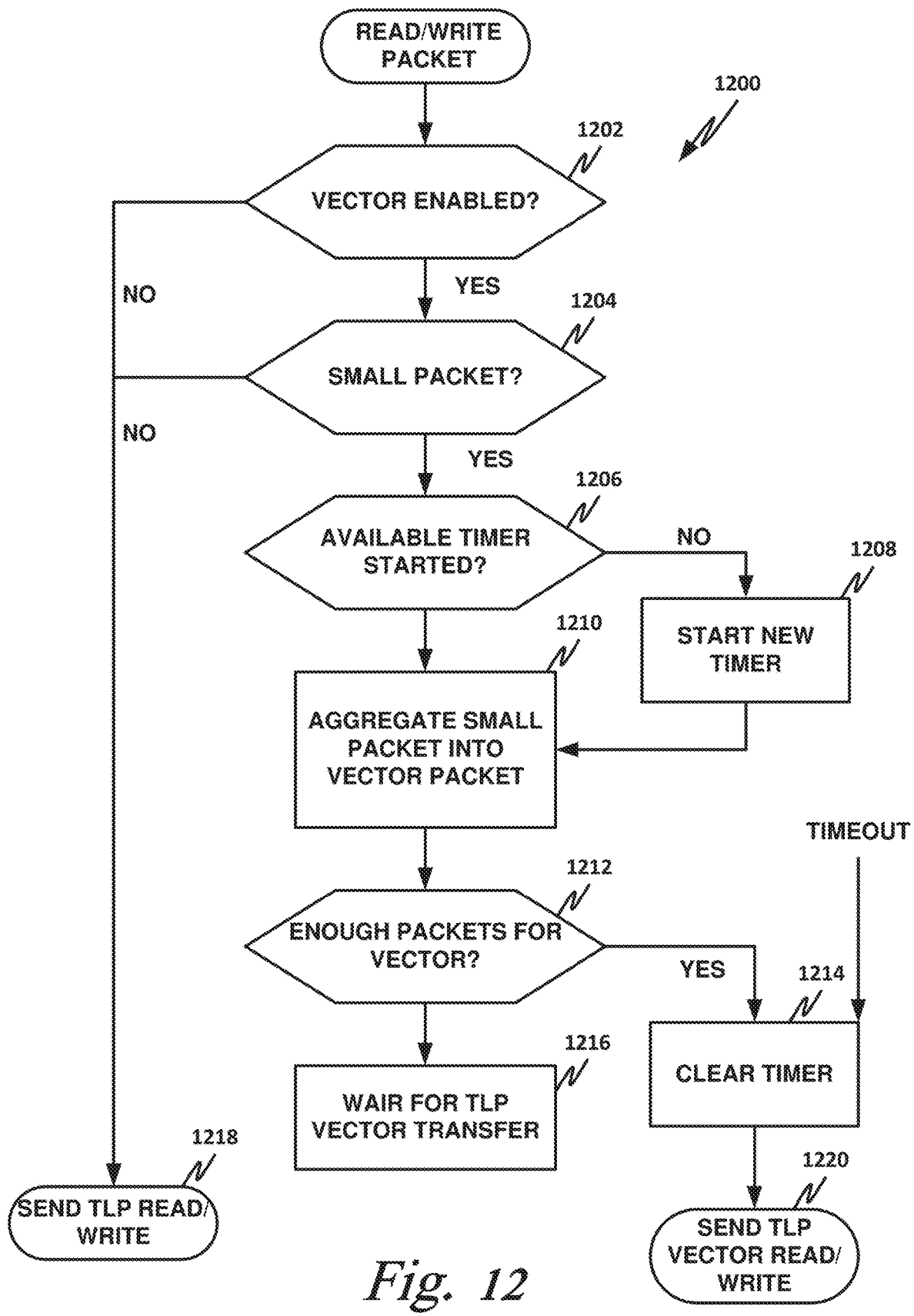
FIG. 12 is a flow chart of a packet vectorization method.

FIG. 12 is a flow chart of a method 1200 that PCIe vector engine 722 (FIG. 7) may perform according to one or more examples of the present specification.

Method 1200 starts with PCIe vector engine 722 reading or writing a packet. In Nock 1202, PCIe vector engine 722 first determines whether vector operations are enabled. This may include, for example, receiving a signal or reading an internally-stored flag.

If vector reading and writing are not enabled, then in Nock 1218, PCIe vector engine 722 simply sends the packet as a standard TLP read or write transaction, according to known methods, and method 1200 is done.

Returning to Nock 1202, if vector operations are enabled, then in decision Nock 1204, PCIe vector engine 722 determines whether the present packet is a "small" packet. This may include determining whether the size of the packet is below a threshold. One example of a threshold is 4 kilobits, corresponding to the 10-bit "Len" field disclosed above. However, the threshold may be larger or smaller than this according to the needs of a particular implementation. In particular, even where a 10-bit "Len" field is used, the threshold need not necessarily be 4 kilobits.

If the packet is not a small packet, then again, in Nock 1218, PCIe vector engine 722 sends a standard TLP message, and the method is done.

If the packet is small, then in decision Nock 1206, PCIe vector engine 722 determines whether an available timer has been started. This may be a timer that watches for a "timeout" condition, where the permissible time for sending a packet has passed. For example, when the first small packet is aggregated and the timer is started, it may be set for the maximum permissible time to wait before sending that packet. If that timer expires, the vector transaction may be sent, whether or not there are "enough" scalar transactions to saturate the vector.

If the timer has not been started, then in Nock 1208, a new timer is started.

In Nock 1210, the small packet is aggregated into to a PCIe vector buffer. If there is no existing vector buffer, a new vector buffer may be allocated in this Nock. If there is an existing vector buffer, then the small transaction may be added to the existing vector buffer.

In Nock 1212, PCIe vector engine 722 determines whether there are enough packets in the vector buffer to "saturate" the vector buffer (i.e., whether the total size of the total number of scalar operations exceed a threshold, or whether the total size of the vector buffer exceeds a threshold). Note that in the case of a scatter/gather, the scalar packets may be in the same format, and thus, the maximum size may relate precisely to the maximum number of packets. But the packets need not be of a uniform size or type, so that in some cases, the vector may comprise a plurality of heterogeneous small packets. Thus, a larger number of smaller "small" packets may be aggregated, or a smaller number of larger "small" packets.

If there are not enough packets to saturate the vector buffer, then in Nock 1216, PCIe vector engine 722 continues waiting for additional packets so that the vector transfer can be completed.

Returning to Nock 1212, if there are enough packets to saturate the vector buffer, then in Nock 1214, PCIe vector engine 722 dears the timeout timer. This may also be triggered separately by a timeout, which may occur asynchronously (e.g., as an interrupt).

After PCIe vector engine 722 dears the timer, in Nock 1220, it sends the TLP vector read or write operation, and the method is done.

Note that the apparatus', methods', and systems described above may be implemented in any electronic device or system as aforementioned. As specific illustrations, the figures below provide exemplary systems for utilizing the teachings as described herein. As the systems below are described in more detail, a number of different interconnects are disclosed, described, and revisited from the discussion above. And as is readily apparent, the advances described above may be applied to any of those interconnects, fabrics, or architectures.

Figure 13:
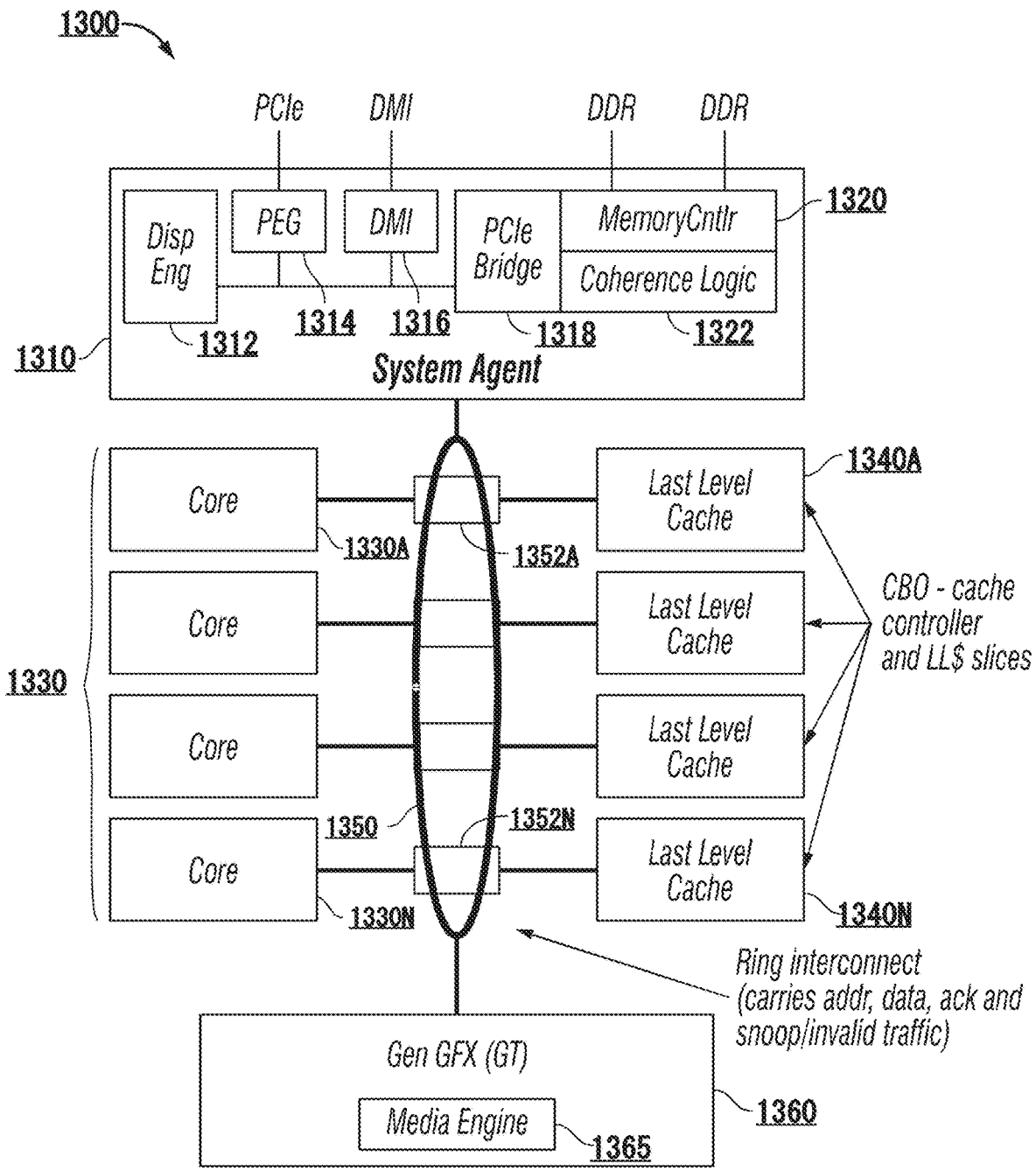
FIG. 13 illustrates a Nock diagram of an example computing system, which may be a system on a chip.

Referring now to FIG. 13, shown is a Nock diagram of an embodiment of a multicore processor. As shown in the embodiment of FIG. 13, processor 1300 includes multiple domains. Specifically, a core domain 1330 includes a plurality of cores 1330A-1330N, a graphics domain 1360 includes one or more graphics engines having a media engine 1365, and a system agent domain 1310.

In various embodiments, system agent domain 1310 handles power control events and power management, such that individual units of domains 1330 and 1360 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1330 and 1360 may operate at different voltage and/or power, and furthermore the individual units within the domains each potentially operate at an independent frequency and voltage. Note that while only shown with three domains, understand the scope of the present teachings is not limited in this regard and additional domains may be present in other embodiments.

As shown, each core 1330 further includes low level caches in addition to various execution units and additional processing elements. Here, the various cores are coupled to each other and to a shared cache memory that is formed of a plurality of units or slices of a last level cache (LLC) 1340A-1340N; these LLCs often include storage and cache controller functionality and are shared amongst the cores, as well as potentially among the graphics engine too.

As seen, a ring interconnect 1350 couples the cores together, and provides interconnection between the core domain 1330, graphics domain 1360 and system agent circuitry 1310, via a plurality of ring stops 1352A-1352N, each at a coupling between a core and LLC slice. As seen in FIG. 13, interconnect 1350 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, Intel On-chip System Fabric (IOSF), an Advanced Microcontroller Bus Architecture (AMBA) interconnect, a multi-dimensional mesh fabric, or other known interconnect architecture) may be utilized in a similar fashion.

As further depicted, system agent domain 1310 includes display engine 1312 which is to provide control of and an interface to an associated display. System agent domain 1310 may include other units, such as: an integrated memory controller 1320 that provides for an interface to a system memory (e.g., a DRAM implemented with multiple DIMMs; coherence logic 1322 to perform memory coherence operations. Multiple interfaces may be present to enable interconnection between the processor and other circuitry. For example, in one embodiment at least one direct media interface (DMI) 1316 interface is provided as well as one or more PCIe™ interfaces 1314. The display engine and these interfaces typically couple to memory via a PCIe™ bridge 1318. Still further, to provide for communications between other agents, such as additional processors or other circuitry, one or more other interfaces (e.g. an Intel® Quick Path Interconnect (QPI) fabric) may be provided.

Figure 14:
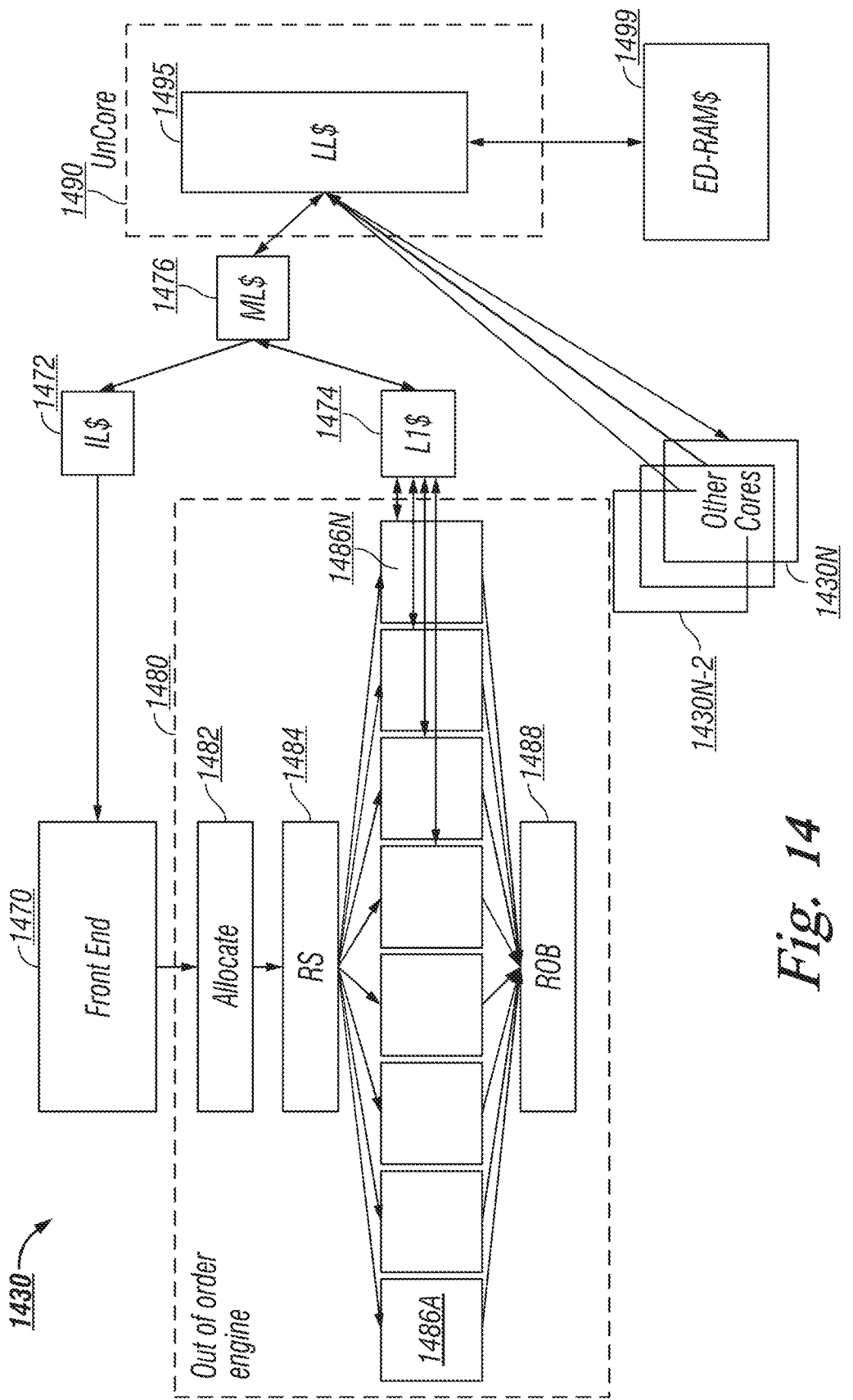
FIG. 14 illustrates an embodiment of a Nock diagram for a processor.

Referring now to FIG. 14, shown is a Nock diagram of a representative core; specifically, logical blocks of a back-end of a core, such as core 1330 from FIG. 13. In general, the structure shown in FIG. 14 includes an out-of-order processor that has a front end unit 1470 used to fetch incoming instructions, perform various processing (e.g. caching, decoding, branch predicting, etc.) and passing instructions/operations along to an out-of-order (OOO) engine 1480. OOO engine 1480 performs further processing on decoded instructions.

Specifically in the embodiment of FIG. 14, out-of-order engine 1480 includes an allocate unit 1482 to receive decoded instructions, which may be in the form of one or more micro-instructions or uops, from front end unit 1470, and allocate them to appropriate resources such as registers and so forth. Next, the instructions are provided to a reservation station 1484, which reserves resources and schedules them for execution on one of a plurality of execution units 1486A-1486N. Various types of execution units may be present, including, for example, arithmetic logic units (ALUs), load and store units, vector processing units (VPUs), floating point execution units, among others. Results from these different execution units are provided to a reorder buffer (ROB) 1488, which take unordered results and return them to correct program order.

Still referring to FIG. 14, note that both front end unit 1470 and out-of-order engine 1480 are coupled to different levels of a memory hierarchy. Specifically shown is an instruction level cache 1472, that in turn couples to a mid-level cache 1476, that in turn couples to a last level cache 1495. In one embodiment, last level cache 1495 is implemented in an on-chip (sometimes referred to as uncore) unit 1490. As an example, unit 1490 is similar to system agent 1310 of FIG. 13. As discussed above, UnCore 1490 communicates with system memory 1499, which, in the illustrated embodiment, is implemented via ED RAM. Note also that the various execution units 1486 within out-of-order engine 1480 are in communication with a first level cache 1474 that also is in communication with mid-level cache 1476. Note also that additional cores 1430N-2-1430N can couple to LLC 1495. Although shown at this high level in the embodiment of FIG. 14, understand that various alterations and additional components may be present.

Figure 15:
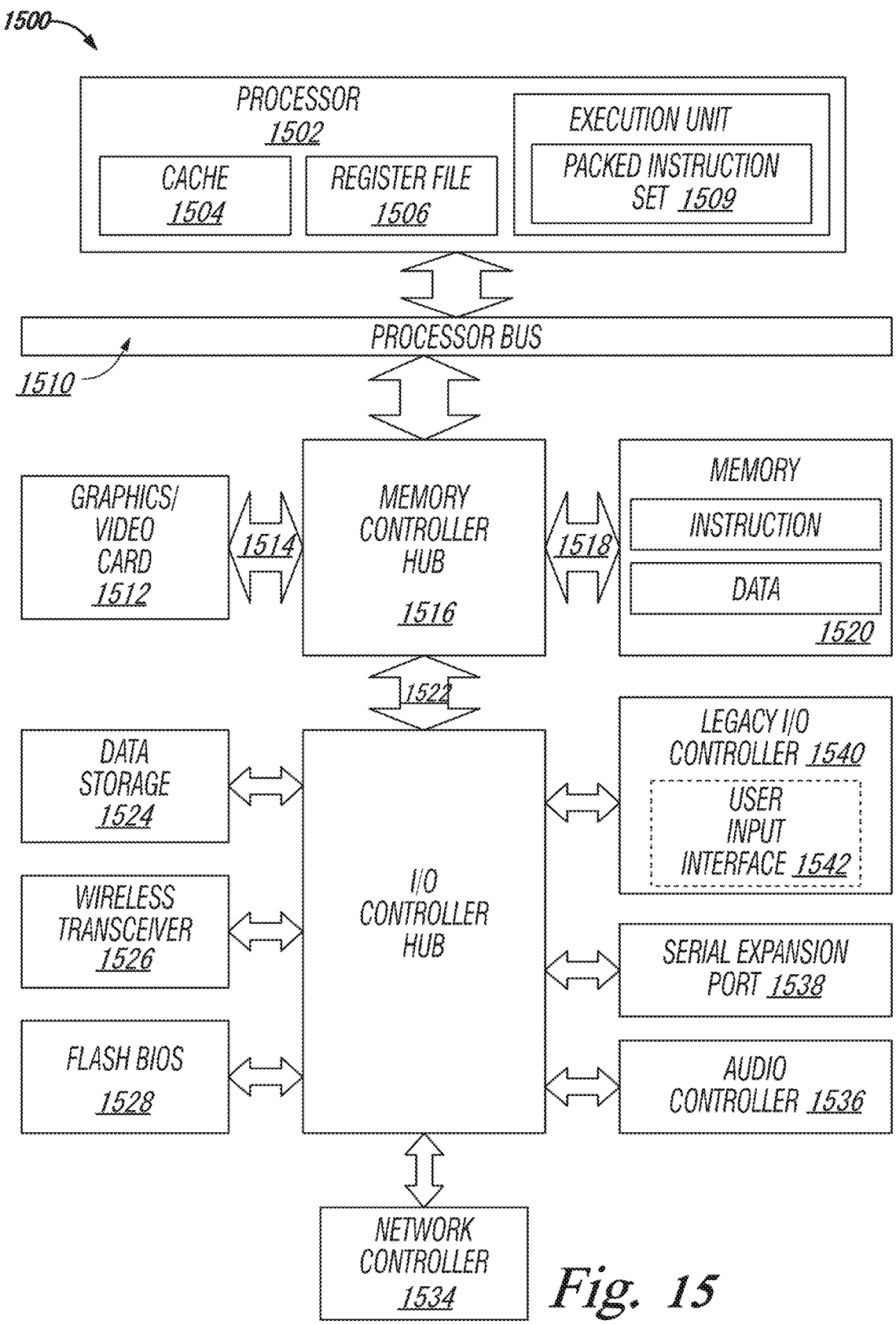
FIG. 15 illustrates another embodiment of a Nock diagram for a computing system including a processor.

Turning to FIG. 15, a Nock diagram of an exemplary computer system formed with a processor that includes execution units to execute an instruction, where one or more of the interconnects implement one or more features in accordance with one embodiment of the present teachings is illustrated. System 1500 includes a component, such as a processor 1502 to employ execution units including logic to perform algorithms for process data, in accordance with the present teachings, such as in the embodiment described herein. System 1500 is representative of processing systems based on the PENTIUM III™, PENTIUM 4™, Xeon™, Itanium, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 1500 executes a version of the WINDOWS™ operating system available from Microsoft Corporation of Redmond, Wash., although other operating systems (UNIX and Linux for example), embedded software, and/or graphical user interfaces, may also be used. Thus, embodiments of the present teachings are not limited to any specific combination of hardware circuitry and software.

Embodiments are not limited to computer systems. Alternative embodiments of the present teachings can be used in other devices such as handheld devices and embedded applications. Some examples of handheld devices include cellular phones, Internet Protocol devices, digital cameras, personal digital assistants (PDAs), and handheld PCs. Embedded applications can include a micro controller, a digital signal processor (DSP), system on a chip, network computers (NetPC), set-top boxes, network hubs, wide area network (WAN) switches, or any other system that can perform one or more instructions in accordance with at least one embodiment.

In this illustrated embodiment, processor 1502 includes one or more execution units 1508 to implement an algorithm that is to perform at least one instruction. One embodiment may be described in the context of a single processor desktop or server system, but alternative embodiments may be included in a multiprocessor system. System 1500 is an example of a 'hub' system architecture. The computer system 1500 includes a processor 1502 to process data signals. The processor 1502, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 1502 is coupled to a processor bus 1510 that transmits data signals between the processor 1502 and other components in the system 1500. The elements of system 1500 (e.g. graphics accelerator 1512, memory controller hub 1516, memory 1520, I/O controller hub 1525, wireless transceiver 1526, Flash BIOS 1528, Network controller 1534, Audio controller 1536, Serial expansion port 1538, I/O controller 1540, etc.) perform their conventional functions that are well known to those familiar with the art.

In one embodiment, the processor 1502 includes a Level 1 (L1) internal cache memory 1504. Depending on the architecture, the processor 1502 may have a single internal cache or multiple levels of internal caches. Other embodiments include a combination of both internal and external caches depending on the particular implementation and needs. Register file 1506 is to store different types of data in various registers including integer registers, floating point registers, vector registers, banked registers, shadow registers, checkpoint registers, status registers, and instruction pointer register.

Execution unit 1508, including logic to perform integer and floating point operations, also resides in the processor 1502. The processor 1502, in one embodiment, includes a microcode (ucode) ROM to store microcode, which when executed, is to perform algorithms for certain macroinstructions or handle complex scenarios. Here, microcode is potentially updateable to handle logic bugs/fixes for processor 1502. For one embodiment, execution unit 1508 includes logic to handle a packed instruction set 1509. By including the packed instruction set 1509 in the instruction set of a general-purpose processor 1502, along with associated circuitry to execute the instructions, the operations used by many multimedia applications may be performed using packed data in a general-purpose processor 1502. Thus, many multimedia applications are accelerated and executed more efficiently by using the full width of a processor's data bus for performing operations on packed data. This potentially eliminates the need to transfer smaller units of data across the processor's data bus to perform one or more operations, one data element at a time.

Alternate embodiments of an execution unit 1508 may also be used in micro controllers, embedded processors, graphics devices, DSPs, and other types of logic circuits. System 1500 includes a memory 1520. Memory 1520 includes a dynamic random access memory (DRAM) device, a static random access memory (SRAM) device, flash memory device, or other memory device. Memory 1520 stores instructions and/or data represented by data signals that are to be executed by the processor 1502.

Note that any of the aforementioned features or aspects of the teachings may be utilized on one or more interconnect illustrated in FIG. 15. For example, an on-die interconnect (ODI), which is not shown, for coupling internal units of processor 1502 implements one or more aspects of the teachings described above. Or the teachings is associated with a processor bus 1510 (e.g. Intel Quick Path Interconnect (QPI) or other known high performance computing interconnect), a high bandwidth memory path 1518 to memory 1520, a point-to-point link to graphics accelerator 1512 (e.g. a Peripheral Component Interconnect express (PCIe) compliant fabric), a controller hub interconnect 1522, an I/O or other interconnect (e.g. USB, PCI, PCIe) for coupling the other illustrated components. Some examples of such components include the audio controller 1536, firmware hub (flash BIOS) 1528, wireless transceiver 1526, data storage 1524, legacy I/O controller 1510 containing user input and keyboard interfaces 1542, a serial expansion port 1538 such as Universal Serial Bus (USB), and a network controller 1534. The data storage device 1524 can comprise a hard disk drive, a floppy disk drive, a CD-ROM device, a flash memory device, or other mass storage device.

Figure 16:
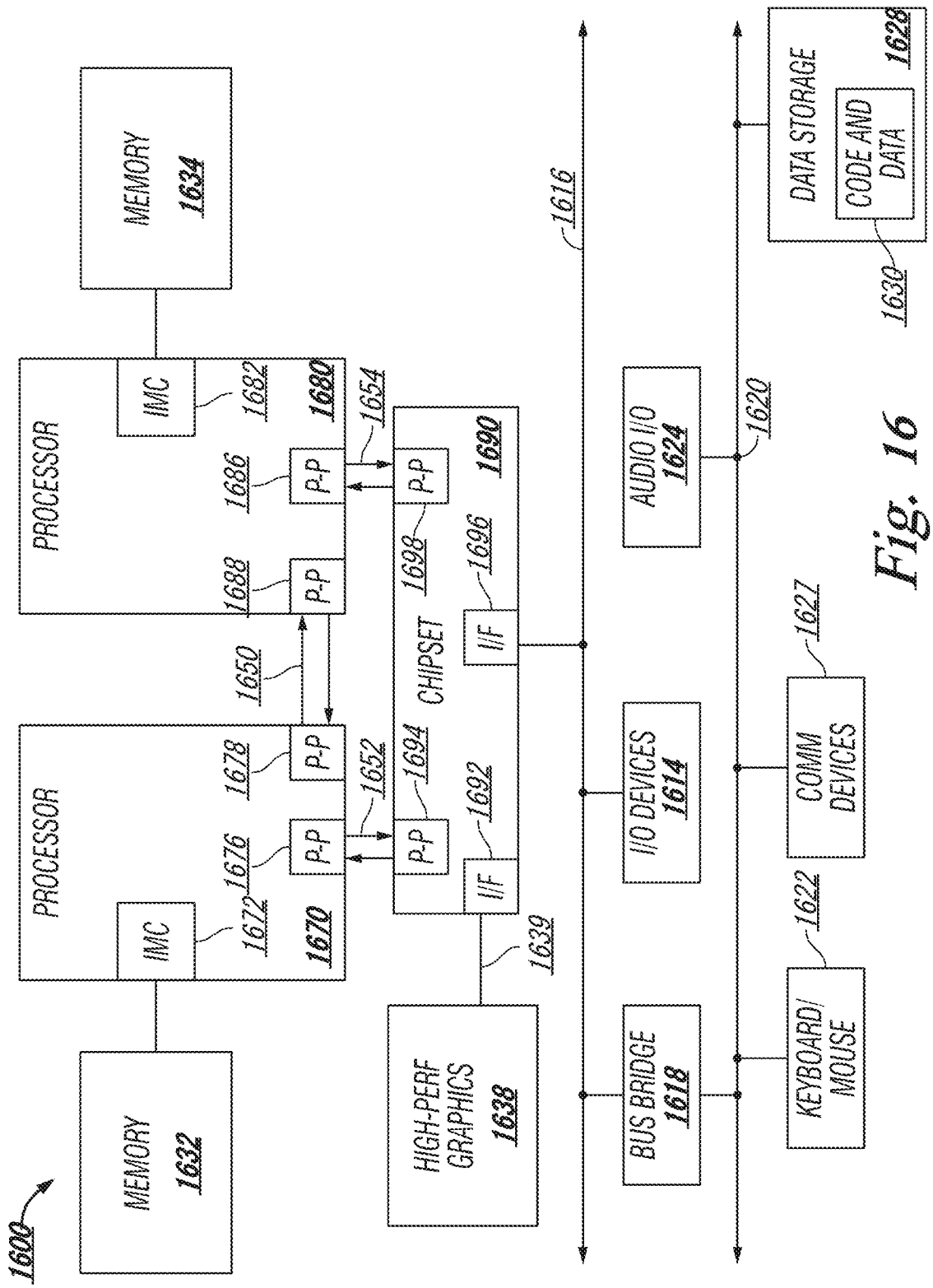
FIG. 16 illustrates an embodiment of a Nock diagram for a computing system including multiple processor sockets.

Referring now to FIG. 16, shown is a Nock diagram of a second system 1600 in accordance with an embodiment of the present teachings. As shown in FIG. 16, multiprocessor system 1600 is a point-to-point interconnect system, and includes a first processor 1670 and a second processor 1680 coupled via a point-to-point interconnect 1650. Each of processors 1670 and 1680 may be some version of a processor. In one embodiment, 1652 and 1654 are part of a serial, point-to-point coherent interconnect fabric, such as Intel's Quick Path Interconnect (QPI) architecture. As a result, the teachings may be implemented within the QPI architecture.

While shown with only two processors 1670, 1680, it is to be understood that the scope of the present teachings is not so limited. In other embodiments, one or more additional processors may be present in a given processor.

Processors 1670 and 1680 are shown including integrated memory controller units 1672 and 1682, respectively. Processor 1670 also includes as part of its bus controller units point-to-point (P-P) interfaces 1676 and 1678; similarly, second processor 1681 includes P-P interfaces 1686 and 1688. Processors 1670, 1680 may exchange information via a point-to-point (P-P) interface 1650 using P-P interface circuits 1678, 1688. As shown in FIG. 16, IMCs 1672 and 1682 couple the processors to respective memories, namely a memory 1632 and a memory 1634, which may be portions of main memory locally attached to the respective processors.

Processors 1670, 1680 each exchange information with a chipset 1690 via individual P-P interfaces 1652, 1654 using point to point interface circuits 1676, 1694, 1686, 1698. Chipset 1690 also exchanges information with a high-performance graphics circuit 1638 via an interface circuit 1692 along a high-performance graphics interconnect 1639.

A shared cache (not shown) may be included in either processor or outside of both processors; yet connected with the processors via P-P interconnect, such that either or both processors' local cache information may be stored in the shared cache if a processor is placed into a low power mode.

Chipset 1690 may be coupled to a first bus 1616 via an interface 1696. In one embodiment, first bus 1616 may be a Peripheral Component Interconnect (PCI) bus, or a bus such as a PCI Express bus or another third generation I/O interconnect bus, although the scope of the present teachings is not so limited.

As shown in FIG. 16, various I/O devices 1614 are coupled to first bus 1616, along with a bus bridge 1618 which couples first bus 1616 to a second bus 1620. In one embodiment, second bus 1620 includes a low pin count (LPC) bus. Various devices are coupled to second bus 1620 including, for example, a keyboard and/or mouse 1622, communication devices 1627 and a storage unit 1628 such as a disk drive or other mass storage device which often includes instructions/code and data 1630, in one embodiment. Further, an audio I/O 1624 is shown coupled to second bus 1620. Note that other architectures are possible, where the included components and interconnect architectures vary. For example, instead of the point-to-point architecture of FIG. 16, a system may implement a multi-drop bus or other such architecture.

FIG. 17

Figure 17:
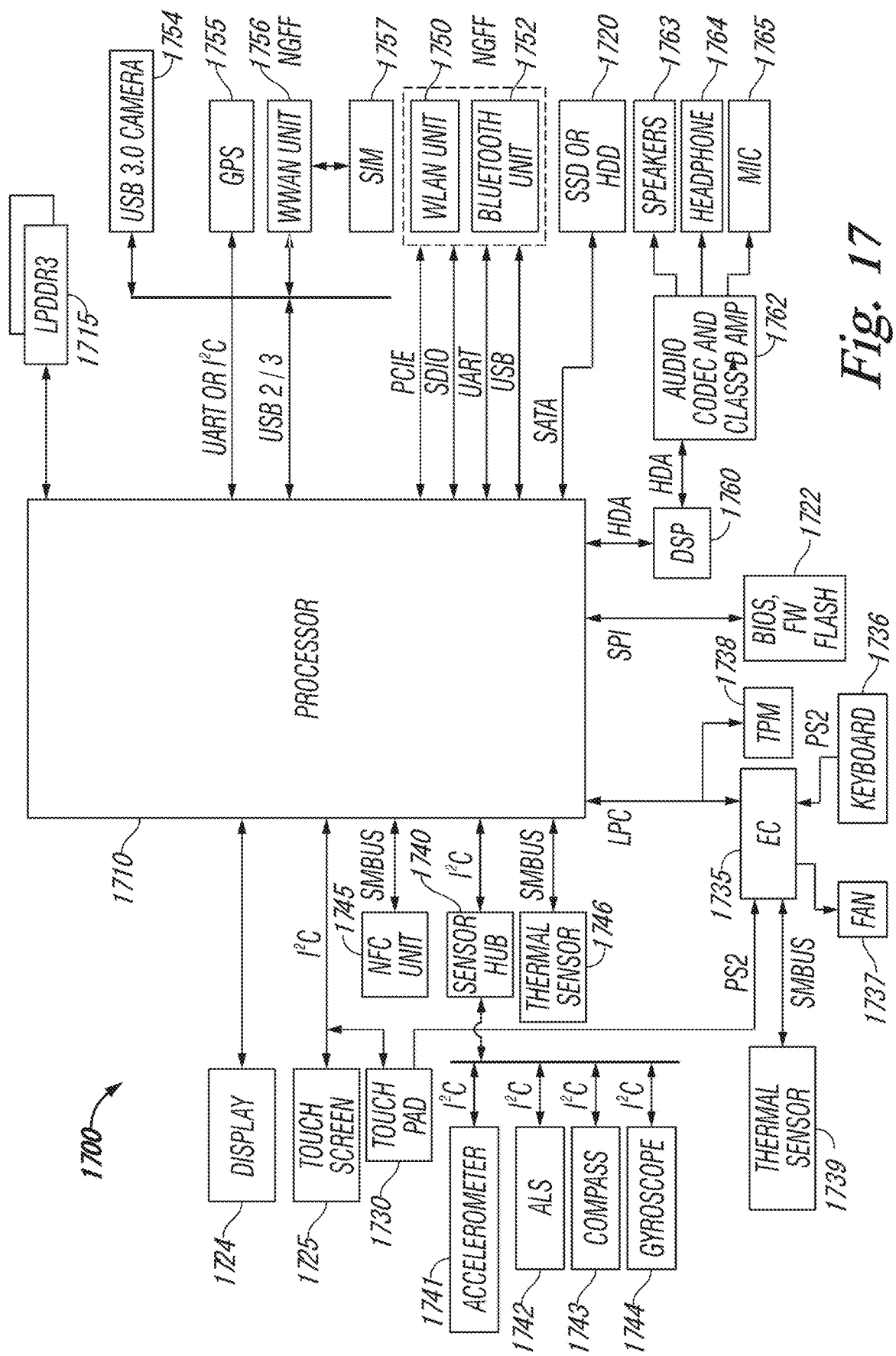
FIG. 17 illustrates another embodiment of a Nock diagram for a computing system.

Referring now to FIG. 17, a Nock diagram of components present in a computer system in accordance with an embodiment of the present teachings is illustrated. As shown in FIG. 17, system 1700 includes any combination of components. These components may be implemented as ICs, portions thereof, discrete electronic devices, or other modules, logic, hardware, software, firmware, or a combination thereof adapted in a computer system, or as components otherwise incorporated within a chassis of the computer system. Note also that the Nock diagram of FIG. 17 is intended to show a high level view of many components of the computer system. However, it is to be understood that some of the components shown may be omitted, additional components may be present, and different arrangement of the components shown may occur in other implementations. As a result, the teachings described above may be implemented in any portion of one or more of the interconnects illustrated or described below.

As seen in FIG. 17, a processor 1710, in one embodiment, includes a microprocessor, multi-core processor, multi-threaded processor, an ultra low voltage processor, an embedded processor, or other known processing element. In the illustrated implementation, processor 1710 acts as a main processing unit and central hub for communication with many of the various components of the system 1700. As one example, processor 1700 is implemented as a system on a chip (SoC). As a specific illustrative example, processor 1710 includes an Intel® Architecture Core™-based processor such as an i3, i5, i7 or another such processor available from Intel Corporation, Santa Clara, Calif. However, understand that other low power processors such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters may instead be present in other embodiments such as an Apple A5/A6 processor, a Qualcomm Snapdragon processor, or TI OMAP processor. Note that many of the customer versions of such processors are modified and varied; however, they may support or recognize a specific instructions set that performs defined algorithms as set forth by the processor licensor. Here, the microarchitectural implementation may vary, but the architectural function of the processor is usually consistent. Certain details regarding the architecture and operation of processor 1710 in one implementation will be discussed further below to provide an illustrative example.

Processor 1710, in one embodiment, communicates with a system memory 1715. As an illustrative example, which in an embodiment can be implemented via multiple memory devices to provide for a given amount of system memory. As examples, the memory can be in accordance with a Joint Electron Devices Engineering Council (JEDEC) low power double data rate (LPDDR)-based design such as the current LPDDR2 standard according to JEDEC JESD 209-2E (published April 2009), or a next generation LPDDR standard to be referred to as LPDDR3 or LPDDR4 that will offer extensions to LPDDR2 to increase bandwidth. In various implementations the individual memory devices may be of different package types such as single die package (SDP), dual die package (DDP) or quad die package (15P). These devices, in some embodiments, are directly soldered onto a motherboard to provide a lower profile solution, while in other embodiments the devices are configured as one or more memory modules that in turn couple to the motherboard by a given connector. And of course, other memory implementations are possible such as other types of memory modules, e.g., dual inline memory modules (DIMMs) of different varieties including but not limited to microDIMMs, MiniDIMMs. In a particular illustrative embodiment, memory is sized between 2 GB and 16 GB, and may be configured as a DDR3LM package or an LPDDR2 or LPDDR3 memory that is soldered onto a motherboard via a ball grid array (BGA).

To provide for persistent storage of information such as data, applications, one or more operating systems and so forth, a mass storage 1720 may also couple to processor 1710. In various embodiments, to enable a thinner and lighter system design as well as to improve system responsiveness, this mass storage may be implemented via a SSD. However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also shown in FIG. 17, a flash device 1722 may be coupled to processor 1710, e.g., via a serial peripheral interface (SPI). This flash device may provide for non-volatile storage of system software, including a basic input/output software (BIOS) as well as other firmware of the system.

In various embodiments, mass storage of the system is implemented by a SSD alone or as a disk, optical or other drive with an SSD cache. In some embodiments, the mass storage is implemented as a SSD or as a HDD along with a restore (RST) cache module. In various implementations, the HDD provides for storage of between 320GB-4 terabytes (TB) and upward while the RST cache is implemented with a SSD having a capacity of 24 GB-256 GB. Note that such SSD cache may be configured as a single level cache (SLC) or multi-level cache (MLC) option to provide an appropriate level of responsiveness. In a SSD-only option, the module may be accommodated in various locations such as in a mSATA or NGFF slot. As an example, an SSD has a capacity ranging from 120GB-1 TB.

Various input/output (IO) devices may be present within system 1700. Specifically shown in the embodiment of FIG. 17 is a display 1724 which may be a high definition LCD or LED panel configured within a lid portion of the chassis. This display panel may also provide for a touch screen 1725, e.g., adapted externally over the display panel such that via a user's interaction with this touch screen, user inputs can be provided to the system to enable desired operations, e.g., with regard to the display of information, accessing of information and so forth. In one embodiment, display 1724 may be coupled to processor 1710 via a display interconnect that can be implemented as a high performance graphics interconnect. Touch screen 1725 may be coupled to processor 1710 via another interconnect, which in an embodiment can be an I$^2$C interconnect. As further shown in FIG. 17, in addition to touch screen 1725, user input by way of touch can also occur via a touch pad 1730 which may be configured within the chassis and may also be coupled to the same I$^2$C interconnect as touch screen 1725.

The display panel may operate in multiple modes. In a first mode, the display panel can be arranged in a transparent state in which the display panel is transparent to visible light. In various embodiments, the majority of the display panel may be a display except for a bezel around the periphery. When the system is operated in a notebook mode and the display panel is operated in a transparent state, a user may view information that is presented on the display panel while also being able to view objects behind the display. In addition, information displayed on the display panel may be viewed by a user positioned behind the display. Or the operating state of the display panel can be an opaque state in which visible light does not transmit through the display panel.

In a tablet mode the system is folded shut such that the back display surface of the display panel comes to rest in a position such that it faces outwardly towards a user, when the bottom surface of the base panel is rested on a surface or held by the user. In the tablet mode of operation, the back display surface performs the role of a display and user interface, as this surface may have touch screen functionality and may perform other known functions of a conventional touch screen device, such as a tablet device. To this end, the display panel may include a transparency-adjusting layer that is disposed between a touch screen layer and a front display surface. In some embodiments the transparency-adjusting layer may be an electrochromic layer (EC), a LCD layer, or a combination of EC and LCD layers.

In various embodiments, the display can be of different sizes, e.g., an 11.6" or a 13.3" screen, and may have a 16:9 aspect ratio, and at least 300 nits brightness. Also the display may be of full high definition (HD) resolution (at least 1920×1080p), be compatible with an embedded display port (eDP), and be a low power panel with panel self refresh.

As to touch screen capabilities, the system may provide for a display multi-touch panel that is multi-touch capacitive and being at least 5 finger capable. And in some embodiments, the display may be 10 finger capable. In one embodiment, the touch screen is accommodated within a damage and scratch-resistant glass and coating (e.g., Gorilla Glass™ or Gorilla Glass 2™) for low friction to reduce "finger burn" and avoid "finger skipping". To provide for an enhanced touch experience and responsiveness, the touch panel, in some implementations, has multi-touch functionality, such as less than 2 frames (30 Hz) per static view during pinch zoom, and single-touch functionality of less than 1 cm per frame (30 Hz) with 200 ms (lag on finger to pointer). The display, in some implementations, supports edge-to-edge glass with a minimal screen bezel that is also flush with the panel surface, and limited IO interference when using multi-touch.

For perceptual computing and other purposes, various sensors may be present within the system and may be coupled to processor 1710 in different manners. Certain inertial and environmental sensors may couple to processor 1710 through a sensor hub 1740, e.g., via an I$^2$C interconnect. In the embodiment shown in FIG. 17, these sensors may include an accelerometer 1741, an ambient light sensor (ALS) 1742, a compass 1743 and a gyroscope 1744. Other environmental sensors may include one or more processor thermal sensors 1746 which in some embodiments couple to processor 1710 via a system management bus (SMBus) bus.

Using the various inertial and environmental sensors present in a platform, many different use cases may be realized. These use cases enable advanced computing operations including perceptual computing and also allow for enhancements with regard to power management/battery life, security, and system responsiveness.

For example with regard to power management/battery life issues, based at least on part on information from an ambient light sensor, the ambient light conditions in a location of the platform are determined and intensity of the display controlled accordingly. Thus, power consumed in operating the display is reduced in certain light conditions.

As to security operations, based on context information obtained from the sensors such as location information, it may be determined whether a user is allowed to access certain secure documents. For example, a user may be permitted to access such documents at a work place or a home location. However, the user is prevented from accessing such documents when the platform is present at a public location. This determination, in one embodiment, is based on location information, e.g., determined via a GPS sensor or camera recognition of landmarks. Other security operations may include providing for pairing of devices within a close range of each other, e.g., a portable platform as described herein and a user's desktop computer, mobile telephone or so forth. Certain sharing, in some implementations, are realized via near field communication when these devices are so paired. However, when the devices exceed a certain range, such sharing may be disabled. Furthermore, when pairing a platform as described herein and a smartphone, an alarm may be configured to be triggered when the devices move more than a predetermined distance from each other, when in a public location. In contrast, when these paired devices are in a safe location, e.g., a work place or home location, the devices may exceed this predetermined limit without triggering such alarm.

Responsiveness may also be enhanced using the sensor information. For example, even when a platform is in a low power state, the sensors may still be enabled to run at a relatively low frequency. Accordingly, any changes in a location of the platform, e.g., as determined by inertial sensors, GPS sensor, or so forth is determined. If no such changes have been registered, a faster connection to a previous wireless hub such as a Wi-Fi™ access point or similar wireless enabler occurs, as there is no need to scan for available wireless network resources in this case. Thus, a greater level of responsiveness when waking from a low power state is achieved.

It is to be understood that many other use cases may be enabled using sensor information obtained via the integrated sensors within a platform as described herein, and the above examples are only for purposes of illustration. Using a system as described herein, a perceptual computing system may allow for the addition of alternative input modalities, including gesture recognition, and enable the system to sense user operations and intent.

In some embodiments one or more infrared or other heat sensing elements, or any other element for sensing the presence or movement of a user may be present. Such sensing elements may include multiple different elements working together, working in sequence, or both. For example, sensing elements include elements that provide initial sensing, such as light or sound projection, followed by sensing for gesture detection by, for example, an ultrasonic time of flight camera or a patterned light camera.

Also in some embodiments, the system includes a light generator to produce an illuminated line. In some embodiments, this line provides a visual cue regarding a virtual boundary, namely an imaginary or virtual location in space, where action of the user to pass or break through the virtual boundary or plane is interpreted as an intent to engage with the computing system. In some embodiments, the illuminated line may change colors as the computing system transitions into different states with regard to the user. The illuminated line may be used to provide a visual cue for the user of a virtual boundary in space, and may be used by the system to determine transitions in state of the computer with regard to the user, including determining when the user wishes to engage with the computer.

In some embodiments, the computer senses user position and operates to interpret the movement of a hand of the user through the virtual boundary as a gesture indicating an intention of the user to engage with the computer. In some embodiments, upon the user passing through the virtual line or plane the light generated by the light generator may change, thereby providing visual feedback to the user that the user has entered an area for providing gestures to provide input to the computer.

Display screens may provide visual indications of transitions of state of the computing system with regard to a user. In some embodiments, a first screen is provided in a first state in which the presence of a user is sensed by the system, such as through use of one or more of the sensing elements.

In some implementations, the system acts to sense user identity, such as by facial recognition. Here, transition to a second screen may be provided in a second state, in which the computing system has recognized the user identity, where this second the screen provides visual feedback to the user that the user has transitioned into a new state. Transition to a third screen may occur in a third state in which the user has confirmed recognition of the user.

In some embodiments, the computing system may use a transition mechanism to determine a location of a virtual boundary for a user, where the location of the virtual boundary may vary with user and context. The computing system may generate a light, such as an illuminated line, to indicate the virtual boundary for engaging with the system. In some embodiments, the computing system may be in a waiting state, and the light may be produced in a first color. The computing system may detect whether the user has reached past the virtual boundary, such as by sensing the presence and movement of the user using sensing elements.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color.

In some embodiments, the computing system may then determine whether gesture movement is detected. If gesture movement is detected, the computing system may proceed with a gesture recognition process, which may include the use of data from a gesture data library, which may reside in memory in the computing device or may be otherwise accessed by the computing device.

If a gesture of the user is recognized, the computing system may perform a function in response to the input, and return to receive additional gestures if the user is within the virtual boundary. In some embodiments, if the gesture is not recognized, the computing system may transition into an error state, where a mechanism to indicate the error state may include the light indicating the virtual boundary changing to a third color, with the system returning to receive additional gestures if the user is within the virtual boundary for engaging with the computing system.

As mentioned above, in other embodiments the system can be configured as a convertible tablet system that can be used in at least two different modes, a tablet mode and a notebook mode. The convertible system may have two panels, namely a display panel and a base panel such that in the tablet mode the two panels are disposed in a stack on top of one another. In the tablet mode, the display panel faces outwardly and may provide touch screen functionality as found in conventional tablets. In the notebook mode, the two panels may be arranged in an open clamshell configuration.

In various embodiments, the accelerometer may be a 3-axis accelerometer having data rates of at least 50 Hz. A gyroscope may also be included, which can be a 3-axis gyroscope. In addition, an e-compass/magnetometer may be present. Also, one or more proximity sensors may be provided (e.g., for lid open to sense when a person is in proximity (or not) to the system and adjust power/performance to extend battery life). For some OS's Sensor Fusion capability including the accelerometer, gyroscope, and compass may provide enhanced features. In addition, via a sensor hub having a real-time dock (RTC), a wake from sensors mechanism may be realized to receive sensor input when a remainder of the system is in a low power state.

In some embodiments, an internal lid/display open switch or sensor to indicate when the lid is closed/open, and can be used to place the system into Connected Standby or automatically wake from Connected Standby state. Other system sensors can include ACPI sensors for internal processor, memory, and skin temperature monitoring to enable changes to processor and system operating states based on sensed parameters.

In an embodiment, the OS may be a Microsoft® Windows® 8 OS that implements Connected Standby (also referred to herein as Win8 CS). Windows 8 Connected Standby or another OS having a similar state can provide, via a platform as described herein, very low ultra idle power to enable applications to remain connected, e.g., to a cloud-based location, at very low power consumption. The platform can supports 3 power states, namely screen on (normal); Connected Standby (as a default "off" state); and shutdown (zero watts of power consumption). Thus in the Connected Standby state, the platform is logically on (at minimal power levels) even though the screen is off. In such a platform, power management can be made to be transparent to applications and maintain constant connectivity, in part due to offload technology to enable the lowest powered component to perform an operation.

Also seen in FIG. 17, various peripheral devices may couple to processor 1710 via a low pin count (LPC) interconnect. In the embodiment shown, various components can be coupled through an embedded controller 1735. Such components can include a keyboard 1736 (e.g., coupled via a PS2 interface), a fan 1737, and an EC thermal sensor 1739. In some embodiments, touch pad 1730 may also couple to EC 1735 via a PS2 interface. In addition, a security processor such as a trusted platform module (TPM) 1738 in accordance with the Trusted Computing Group (TCG) TPM Specification Version 1.2, dated Oct. 2, 2003, may also couple to processor 1710 via this LPC interconnect. However, understand the scope of the present teachings is not limited in this regard and secure processing and storage of secure information may be in another protected location such as a static random access memory (SRAM) in a security coprocessor, or as encrypted data Nobs that are only decrypted when protected by a secure enclave (SE) processor mode.

In a particular implementation, peripheral ports may include a high definition media interface (HDMI) connector (which can be of different form factors such as full size, mini or micro); one or more USB ports, such as full-size external ports in accordance with the Universal Serial Bus Revision 3.0 Specification (November 2008), with at least one powered for charging of USB devices (such as smartphones) when the system is in Connected Standby state and is plugged into AC wall power. In addition, one or more Thunderbolt™ ports can be provided. Other ports may include an externally accessible card reader such as a full size SD-XC card reader and/or a SIM card reader for WWAN (e.g., an 8 pin card reader). For audio, a 3.5 mm jack with stereo sound and microphone capability (e.g., combination functionality) can be present, with support for jack detection (e.g., headphone only support using microphone in the lid or headphone with microphone in cable). In some embodiments, this jack can be re-taskable between stereo headphone and stereo microphone input. Also, a power jack can be provided for coupling to an AC brick.

System 1700 can communicate with external devices in a variety of manners, including wirelessly. In the embodiment shown in FIG. 17, various wireless modules, each of which can correspond to a radio configured for a particular wireless communication protocol, are present. One manner for wireless communication in a short range such as a near field may be via a near field communication (NFC) unit 1745 which may communicate, in one embodiment with processor 1710 via an SMBus. Note that via this NFC unit 1745, devices in close proximity to each other can communicate. For example, a user can enable system 1700 to communicate with another (e.g.,) portable device such as a smartphone of the user via adapting the two devices together in close relation and enabling transfer of information such as identification information payment information, data such as image data or so forth. Wireless power transfer may also be performed using a NFC system.

Using the NFC unit described herein, users can bump devices side-to-side and place devices side-by-side for near field coupling functions (such as near field communication and wireless power transfer (WPT)) by leveraging the coupling between coils of one or more of such devices. More specifically, embodiments provide devices with strategically shaped, and placed, ferrite materials, to provide for better coupling of the coils. Each coil has an inductance associated with it, which can be chosen in conjunction with the resistive, capacitive, and other features of the system to enable a common resonant frequency for the system.

As further seen in FIG. 17, additional wireless units can include other short range wireless engines including a WLAN unit 1750 and a Bluetooth unit 1752. Using WLAN unit 1750, Wi-Fi™ communications in accordance with a given Institute of Electrical and Electronics Engineers (IEEE) 802.11 standard can be realized, while via Bluetooth unit 1752, short range communications via a Bluetooth protocol can occur. These units may communicate with processor 1710 via, e.g., a USB link or a universal asynchronous receiver transmitter (UART) link. Or these units may couple to processor 1710 via an interconnect according to a Peripheral Component Interconnect Express™ (PCIe™) protocol, e.g., in accordance with the PCI Express™ Specification Base Specification version 3.0 (published Jan. 17, 2007), or another such protocol such as a serial data input/output (SDIO) standard. Of course, the actual physical connection between these peripheral devices, which may be configured on one or more add-in cards, can be by way of the NGFF connectors adapted to a motherboard.

In addition, wireless wide area communications, e.g., according to a cellular or other wireless wide area protocol, can occur via a WWAN unit 1756 which in turn may couple to a subscriber identity module (SIM) 1757. In addition, to enable receipt and use of location information, a GPS module 1755 may also be present. Note that in the embodiment shown in FIG. 17, WWAN unit 1756 and an integrated capture device such as a camera module 1754 may communicate via a given USB protocol such as a USB 2.0 or 3.0 link, or a UART or I$^2$C protocol. Again the actual physical connection of these units can be via adaptation of a NGFF add-in card to an NGFF connector configured on the motherboard.

In a particular embodiment, wireless functionality can be provided modularly, e.g., with a WiFi™ 802.11ac solution (e.g., add-in card that is backward compatible with IEEE 802.11abgn) with support for Windows 8 CS. This card can be configured in an internal slot (e.g., via an NGFF adapter). An additional module may provide for Bluetooth capability (e.g., Bluetooth 4.0 with backwards compatibility) as well as Intel® Wireless Display functionality. In addition NFC support may be provided via a separate device or multifunction device, and can be positioned as an example, in a front right portion of the chassis for easy access. A still additional module may be a WWAN device that can provide support for 3G/4G/LTE and GPS. This module can be implemented in an internal (e.g., NGFF) slot. Integrated antenna support can be provided for WiFi™, Bluetooth, WWAN, NFC and GPS, enabling seamless transition from WiFi™ to WWAN radios, wireless gigabit (WiGig) in accordance with the Wireless Gigabit Specification (July 2010), and vice versa.

As described above, an integrated camera can be incorporated in the lid. As one example, this camera can be a high resolution camera, e.g., having a resolution of at least 2.0 megapixels (MP) and extending to 6.0 MP and beyond.

To provide for audio inputs and outputs, an audio processor can be implemented via a digital signal processor (DSP) 1760, which may couple to processor 1710 via a high definition audio (HDA) link. Similarly, DSP 1760 may communicate with an integrated coder/decoder (CODEC) and amplifier 1762 that in turn may couple to output speakers 1763 which may be implemented within the chassis. Similarly, amplifier and CODEC 1762 can be coupled to receive audio inputs from a microphone 1765 which in an embodiment can be implemented via dual array microphones (such as a digital microphone array) to provide for high quality audio inputs to enable voice-activated control of various operations within the system. Note also that audio outputs can be provided from amplifier/CODEC 1762 to a headphone jack 1764. Although shown with these particular components in the embodiment of FIG. 17, understand the scope of the present teachings is not limited in this regard.

In a particular embodiment, the digital audio codec and amplifier are capable of driving the stereo headphone jack, stereo microphone jack, an internal microphone array and stereo speakers. In different implementations, the codec can be integrated into an audio DSP or coupled via an HD audio path to a peripheral controller hub (PCH). In some implementations, in addition to integrated stereo speakers, one or more bass speakers can be provided, and the speaker solution can support DTS audio.

In some embodiments, processor 1710 may be powered by an external voltage regulator (VR) and multiple internal voltage regulators that are integrated inside the processor die, referred to as fully integrated voltage regulators (FIVRs). The use of multiple FIVRs in the processor enables the grouping of components into separate power planes, such that power is regulated and supplied by the FIVR to only those components in the group. During power management, a given power plane of one FIVR may be powered down or off when the processor is placed into a certain low power state, while another power plane of another FIVR remains active, or fully powered.

In one embodiment, a sustain power plane can be used during some deep sleep states to power on the I/O pins for several I/O signals, such as the interface between the processor and a PCH, the interface with the external VR and the interface with EC 1735. This sustain power plane also powers an on-die voltage regulator that supports the onboard SRAM or other cache memory in which the processor context is stored during the sleep state. The sustain power plane is also used to power on the processor's wakeup logic that monitors and processes the various wakeup source signals.

During power management, while other power planes are powered down or off when the processor enters certain deep sleep states, the sustain power plane remains powered on to support the above-referenced components. However, this can lead to unnecessary power consumption or dissipation when those components are not needed. To this end, embodiments may provide a connected standby sleep state to maintain processor context using a dedicated power plane. In one embodiment, the connected standby sleep state facilitates processor wakeup using resources of a PCH which itself may be present in a package with the processor. In one embodiment, the connected standby sleep state facilitates sustaining processor architectural functions in the PCH until processor wakeup, this enabling turning off all of the unnecessary processor components that were previously left powered on during deep sleep states, including turning off all of the docks. In one embodiment, the PCH contains a time stamp counter (TSC) and connected standby logic for controlling the system during the connected standby state. The integrated voltage regulator for the sustain power plane may reside on the PCH as well.

In an embodiment, during the connected standby state, an integrated voltage regulator may function as a dedicated power plane that remains powered on to support the dedicated cache memory in which the processor context is stored such as critical state variables when the processor enters the deep sleep states and connected standby state. This critical state may include state variables associated with the architectural, micro-architectural, debug state, and/or similar state variables associated with the processor.

The wakeup source signals from EC 1735 may be sent to the PCH instead of the processor during the connected standby state so that the PCH can manage the wakeup processing instead of the processor. In addition, the TSC is maintained in the PCH to facilitate sustaining processor architectural functions. Although shown with these particular components in the embodiment of FIG. 17, understand the scope of the present teachings is not limited in this regard.

Power control in the processor can lead to enhanced power savings. For example, power can be dynamically allocate between cores, individual cores can change frequency/voltage, and multiple deep low power states can be provided to enable very low power consumption. In addition, dynamic control of the cores or independent core portions can provide for reduced power consumption by powering off components when they are not being used.

Some implementations may provide a specific power management IC (PMIC) to control platform power. Using this solution, a system may see very low (e.g., less than 5%) battery degradation over an extended duration (e.g., 16 hours) when in a given standby state, such as when in a Win8 Connected Standby state. In a Win8 idle state a battery life exceeding, e.g., 9 hours may be realized (e.g., at 150 nits). As to video playback, a long battery life can be realized, e.g., full HD video playback can occur for a minimum of 6 hours. A platform in one implementation may have an energy capacity of, e.g., 35 watt hours (Whr) for a Win8 CS using an SSD and (e.g.,) 40-44 Whr for Win8 CS using an HDD with a RST cache configuration.

A particular implementation may provide support for 15 W nominal CPU thermal design power (TDP), with a configurable CPU TDP of up to approximately 25 W TDP design point. The platform may include minimal vents owing to the thermal features described above. In addition, the platform is pillow-friendly (in that no hot air is blowing at the user). Different maximum temperature points can be realized depending on the chassis material. In one implementation of a plastic chassis (at least having to lid or base portion of plastic), the maximum operating temperature can be 52 degrees Celsius (C). And for an implementation of a metal chassis, the maximum operating temperature can be 46° C.

In different implementations, a security module such as a TPM can be integrated into a processor or can be a discrete device such as a TPM 2.0 device. With an integrated security module, also referred to as Platform Trust Technology (PTT), BIOS/firmware can be enabled to expose certain hardware features for certain security features, including secure instructions, secure boot, Intel® Anti-Theft Technology, Intel® Identity Protection Technology, Intel® Trusted Execution Technology (TXT), and Intel® Manageability Engine Technology along with secure user interfaces such as a secure keyboard and display.

Figure 18:
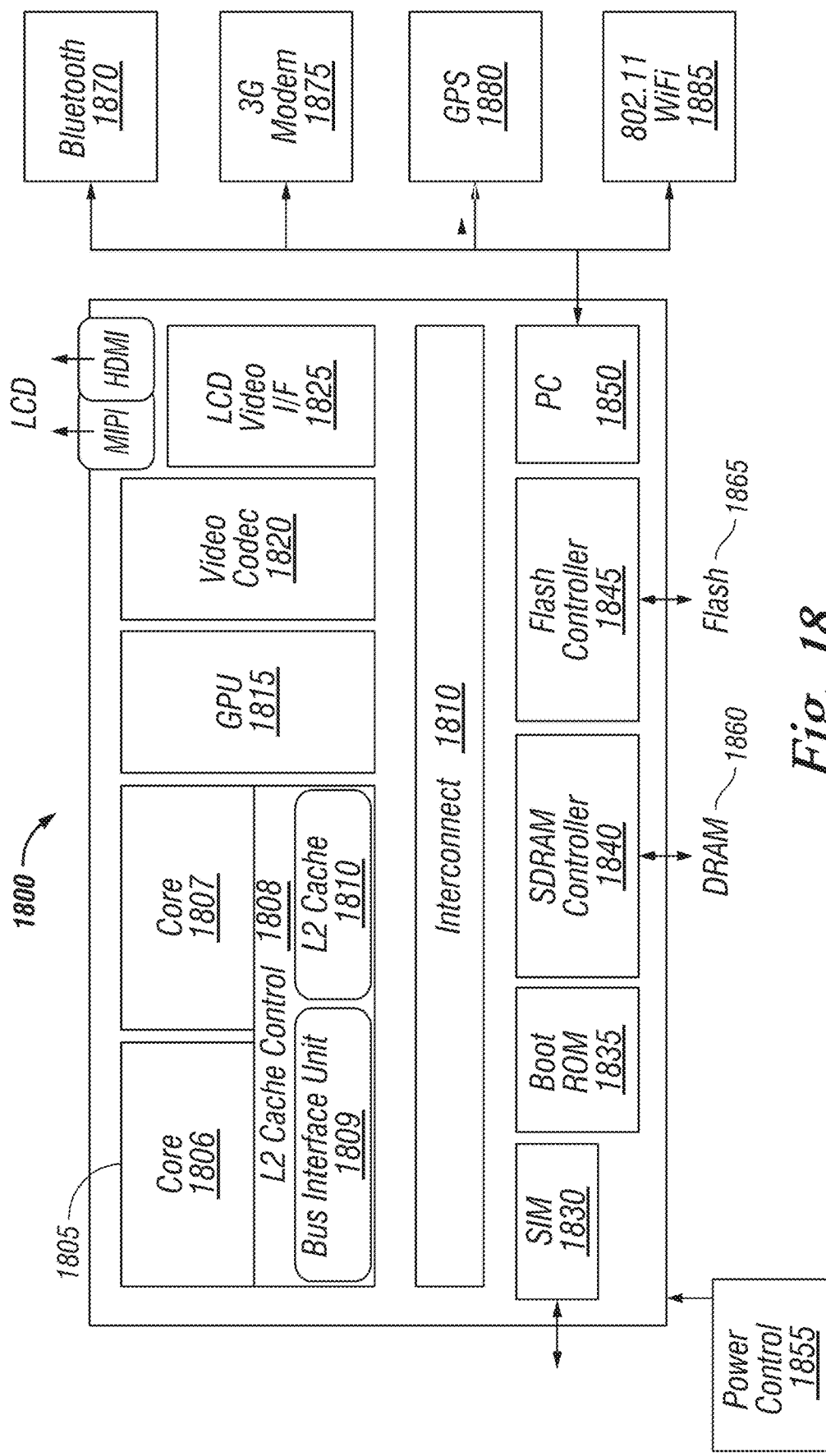
FIG. 18 illustrates another embodiment of a Nock diagram for a computing system.

Turning next to FIG. 18, an embodiment of a system on-chip (SOC) design in accordance with the teachings is depicted. As a specific illustrative example, SOC 1800 is included in user equipment (UE). In one embodiment, UE refers to any device to be used by an end-user to communicate, such as a hand-held phone, smartphone, tablet, ultra-thin notebook, notebook with broadband adapter, or any other similar communication device. Often a UE connects to a base station or node, which potentially corresponds in nature to a mobile station (MS) in a GSM network.

Here, SOC 1800 includes 2 cores—1806 and 1807. Similar to the discussion above, cores 1806 and 1807 may conform to an Instruction Set Architecture, such as an Intel® Architecture Core™-based processor, an Advanced Micro Devices, Inc. (AMD) processor, a MIPS-based processor, an ARM-based processor design, or a customer thereof, as well as their licensees or adopters. Cores 1806 and 1807 are coupled to cache control 1808 that is associated with bus interface unit 1809 and L2 cache 1810 to communicate with other parts of system 1800. Interconnect 1812 includes an on-chip interconnect, such as an IOSF, AMBA, or other interconnect discussed above, which potentially implements one or more aspects of the described teachings.

Interconnect 1812 provides communication channels to the other components, such as a Subscriber Identity Module (SIM) 1830 to interface with a SIM card, a boot rom 1835 to hold boot code for execution by cores 1806 and 1807 to initialize and boot SOC 1800, a SDRAM controller 1840 to interface with external memory (e.g. DRAM 1860), a flash controller 1845 to interface with non-volatile memory (e.g. Flash 1865), a peripheral control 1450 (e.g. Serial Peripheral Interface) to interface with peripherals, video codecs 1820 and Video interface 1825 to display and receive input (e.g. touch enabled input), GPU 1815 to perform graphics related computations, etc. Any of these interfaces may incorporate aspects of the teachings described herein.

In addition, the system illustrates peripherals for communication, such as a Bluetooth module 1870, 3G modem 1875, GPS 1880, and WiFi 1885. Note as stated above, a UE includes a radio for communication. As a result, these peripheral communication modules are not all required. However, in a UE some form a radio for external communication is to be included.

While the present teachings has been described with respect to a limited number of embodiments, those skilled in the art will appreciate numerous modifications and variations therefrom. It is intended that the appended claims cover all such modifications and variations as fall within the true spirit and scope of this present teachings.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present teachings.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a dock does not include every potential logic gate that may provide a 1 or 0. Instead, the logic gate is one coupled in some manner that during operation the 1 or 0 output is to enable the dock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the teachings may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present teachings. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the teachings as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

There is disclosed by way of example, an endpoint apparatus for an interconnect, comprising: a mechanical and electrical interface to the interconnect; and one or more logic elements comprising an interface vector engine to: receive a first scalar transaction for the interface; determine that the first scalar transaction meets a criterion for vectorization; receive a second scalar transaction for the interface; determine that the second transaction meets the criterion for vectorization; vectorize the first scalar transaction and second scalar transaction into a vector transaction; and send the vector transaction via the electrical interface.

There is also disclosed an example, wherein the interface vector engine is further to determine that a timeout has expired without receiving the second scalar transaction, and send the first scalar transaction via the electrical interface.

There is also disclosed an example, wherein the interface vector engine is further to receive a plurality of additional scalar transactions up to a maximum n scalar transactions, and to vectorize the first, second, and additional scalar transactions into the vector transaction.

There is also disclosed an example, wherein the interface vector engine is further to determine that a timeout has expired after receiving m scalar transactions, wherein m<n, and to vectorize the first, second, and additional scalar transactions into the vector transaction.

There is also disclosed an example, further comprising means for a user configuring the timeout.

There is also disclosed an example, wherein the interface vector engine is further to: receive m scalar transactions, wherein m<n; receive a kth scalar transaction; determine that the kth scalar transaction does not meet the criterion for vectorization; vectorize the m scalar transactions into the vector transaction; and send the kth scalar transaction via the electrical interface.

There is also disclosed an example, wherein the criterion for vectorization is a maximum transaction size.

There is also disclosed an example, further comprising means for a user configuring the maximum transaction size.

There is also disclosed an example, wherein the vector engine is further to provide a vector read message, the vector read message comprising a field for a number of scalar reads to perform, a field for the individual lengths of the scalar reads, and a plurality of source addresses.

There is also disclosed an example, wherein the vector engine is further to provide a vector write message, the vector write message comprising a field for a number of scalar writes to perform, a field for the individual lengths of the scalar writes, and a plurality of write destination addresses.

There is also disclosed an example, wherein the vector engine is further to provide a vector read complete message, the vector read complete message comprising a plurality of payloads.

There is also disclosed an example wherein the interconnect is a PCIe interconnect.

There is also disclosed an example of one or more tangible, non-transitory computer-readable mediums having stored thereon executable instructions for instructing a processor to: communicatively couple to an interconnect via an electrical interface; and provide an interface vector engine to: receive a first scalar transaction for the interface; determine that the first scalar transaction meets a criterion for vectorization; receive a second scalar transaction for the interface; determine that the second transaction meets the criterion for vectorization; vectorize the first scalar transaction and second scalar transaction into a vector transaction; and send the vector transaction via the electrical interface.

There is also disclosed an example, wherein the interface vector engine is further to determine that a timeout has expired without receiving the second scalar transaction, and send the first scalar transaction via the electrical interface.

There is also disclosed an example, wherein the interface vector engine is further to receive a plurality of additional scalar transactions up to a maximum n scalar transactions, and to vectorize the first, second, and additional scalar transactions into the vector transaction.

There is also disclosed an example, wherein the interface vector engine is further to determine that a timeout has expired after receiving m scalar transactions, wherein m<n, and to vectorize the first, second, and additional scalar transactions into the vector transaction.

There is also disclosed an example, further comprising means for a user configuring the timeout.

There is also disclosed an example, wherein the interface vector engine is further to: receive m scalar transactions, wherein m<n; receive a kth scalar transaction; determine that the kth scalar transaction does not meet the criterion for vectorization; vectorize the m scalar transactions into the vector transaction; and send the kth scalar transaction via the electrical interface.

There is also disclosed an example, wherein the criterion for vectorization is a maximum transaction size.

There is also disclosed an example, wherein the vector engine is further to provide a vector read message, the vector read message comprising a field for a number of scalar reads to perform, a field for the individual lengths of the scalar reads, and a plurality of source addresses.

There is also disclosed an example, wherein the vector engine is further to provide a vector write message, the vector write message comprising a field for a number of scalar writes to perform, a field for the individual lengths of the scalar writes, and a plurality of write destination addresses.

There is also disclosed an example, wherein the vector engine is further to provide a vector read complete message, the vector read complete message comprising a plurality of payloads.

There is also disclosed an example, wherein the interconnect is a PCIe interconnect.

There is also disclosed an example of an interconnect controller, comprising: a mechanical and electrical interface to an interconnect; and one or more logic elements comprising a scalar memory adapter to: receive a vector memory message via the interconnect; convert the vector memory message into a plurality of scalar memory messages; and send the scalar memory messages via the interconnect.

There is also disclosed an example, wherein the scalar memory adapter is further to: receive a plurality of scalar memory messages via the interconnect, the scalar memory messages responsive to a first vector memory message; aggregate the plurality of scalar memory messages into a second vector memory message; and send the second vector memory message via the interconnect.

There is also disclosed an example, wherein the interconnect is a PCIe interconnect.

What is claimed is:

1. An endpoint apparatus for a peripheral component interconnect express (PCIe) interconnect, comprising:
    a mechanical and electrical interface to the PCIe interconnect; and
    circuitry to:
        receive a first scalar transaction for the interface, wherein the first scalar transaction is a first PCIe direct memory access (DMA) descriptor;
        determine that the first scalar transaction meets a criterion for vectorization, wherein the criterion comprises at least identifying two or more scalar transactions of the same size;
        receive a second scalar transaction for the interface, wherein the second scalar transaction is a second PCIe DMA descriptor;
        determine that the second scalar transaction meets the criterion for vectorization, comprising determining at least that the first scalar transaction and second scalar transaction are of the same size;
        vectorize the first scalar transaction and second scalar transaction into a vector transaction; and
        send the vector transaction via the interface.

2. The apparatus of claim 1, wherein the circuitry is further to determine that a timeout has expired without receiving the second scalar transaction, and send the first scalar transaction via the interface.

3. The apparatus of claim 1, wherein the circuitry is further to receive a plurality of additional scalar transactions up to a maximum n scalar transactions, and to vectorize the first, second, and additional scalar transactions into the vector transaction.

4. The apparatus of claim 3, wherein the circuitry is further to determine that a timeout has expired after receiving m scalar transactions, wherein m<n, and to vectorize the first, second, and additional scalar transactions into the vector transaction.

5. The apparatus of claim 4, further comprising a user interface for enabling a user to configure the timeout.

6. The apparatus of claim 3, wherein the circuitry is further to:
    receive m scalar transactions, wherein m<n;
    receive a kth scalar transaction;
    determine that the kth scalar transaction does not meet the criterion for vectorization;
    vectorize the m scalar transactions into the vector transaction; and
    send the kth scalar transaction via the interface.

7. The apparatus of claim 1, wherein the criterion for vectorization is a maximum transaction size.

8. The apparatus of claim 7, further comprising means for a user configuring the maximum transaction size.

9. The apparatus of claim 1, wherein the circuitry is further to provide a vector read message, the vector read message comprising a field for a number of scalar reads to perform, a field for individual lengths of the scalar reads, and a plurality of source addresses.

10. The apparatus of claim 1, wherein the circuitry is further to provide a vector write message, the vector write message comprising a field for a number of scalar writes to perform, a field for individual lengths of the scalar writes, and a plurality of write destination addresses.

11. The apparatus of claim 1, wherein the circuitry is further to provide a vector read complete message, the vector read complete message comprising a plurality of payloads.

12. One or more tangible, non-transitory computer-readable mediums having stored thereon executable instructions for instructing a processor to:
communicatively couple to a peripheral component interconnect express (PCIe) interconnect via an electrical interface; and
provide an interface vector engine to:
receive a first scalar transaction for the electrical interface, wherein the first scalar transaction is a first PCIe direct memory access (DMA) descriptor;
determine that the first scalar transaction meets a criterion for vectorization, wherein the criterion includes at least identifying two or more scalar transactions of the same size;
receive a second scalar transaction for the electrical interface, wherein the second scalar transaction is a second PCIe DMA descriptor;
determine that the second scalar transaction meets the criterion for vectorization, including determining that the second scalar transaction is of the same size as the first scalar transaction;
vectorize the first scalar transaction and second scalar transaction into a vector transaction; and
send the vector transaction via the electrical interface.

13. The one or more tangible, non-transitory computer-readable mediums of claim 12, wherein the interface vector engine is further to determine that a timeout has expired without receiving the second scalar transaction, and send the first scalar transaction via the electrical interface.

14. The one or more tangible, non-transitory computer-readable mediums of claim 12, wherein the interface vector engine is further to receive a plurality of additional scalar transactions up to a maximum n scalar transactions, and to vectorize the first, second, and additional scalar transactions into the vector transaction.

15. The one or more tangible, non-transitory computer-readable mediums of claim 14, wherein the interface vector engine is further to determine that a timeout has expired after receiving m scalar transactions, wherein m<n, and to vectorize the first, second, and additional scalar transactions into the vector transaction.

16. The one or more tangible, non-transitory computer-readable mediums of claim 15, further comprising means for a user configuring the timeout.

17. An interconnect controller, comprising:
a mechanical and electrical interface to a peripheral component interconnect express (PCIe) interconnect; and
circuitry to:
receive a vector memory message via the interconnect;
convert the vector memory message into a plurality of scalar memory messages, wherein the scalar memory messages are first and second PCIe direct memory access (DMA) descriptors of uniform size; and
send the scalar memory messages via the interconnect.

18. The interconnect controller of claim 17, wherein the circuitry is further to:
receive a plurality of scalar memory messages via the interconnect, the scalar memory messages responsive to a first vector memory message;
aggregate the plurality of scalar memory messages into a second vector memory message; and
send the second vector memory message via the interconnect.

* * * * *